United States Patent
Shirota

(10) Patent No.: US 8,270,090 B2
(45) Date of Patent: Sep. 18, 2012

(54) ZOOM LENS AND IMAGE PICKUP APPARATUS EQUIPPED WITH SAME

(75) Inventor: Eiji Shirota, Hino (JP)

(73) Assignee: Olympus Imaging Corp., Tokyo (JP)

( * ) Notice: Subject to any disclaimer, the term of this patent is extended or adjusted under 35 U.S.C. 154(b) by 120 days.

(21) Appl. No.: 12/590,617

(22) Filed: Nov. 10, 2009

(65) Prior Publication Data

US 2010/0128361 A1    May 27, 2010

(30) Foreign Application Priority Data

Nov. 26, 2008  (JP) ................... 2008-300360

(51) Int. Cl.
G02B 15/14    (2006.01)
G02B 17/00    (2006.01)

(52) U.S. Cl. .................. 359/676; 359/683; 359/733

(58) Field of Classification Search ............ 359/676, 359/678, 683, 685

See application file for complete search history.

(56) References Cited

U.S. PATENT DOCUMENTS

| | | | | |
|---|---|---|---|---|
| 6,825,989 B2 * | 11/2004 | Uzawa et al. | .......... | 359/684 |
| 7,110,186 B2 | 9/2006 | Sueyoshi | | |
| 7,253,962 B2 * | 8/2007 | Sano | .......... | 359/684 |
| 7,295,380 B2 | 11/2007 | Sueyoshi | | |
| 7,312,931 B2 * | 12/2007 | Sano et al. | .......... | 359/683 |
| 7,312,934 B2 | 12/2007 | Iwasawa | | |
| 7,433,131 B2 | 10/2008 | Iwasawa | | |
| 8,018,659 B2 * | 9/2011 | Mihara | .......... | 359/683 |
| 2005/0007678 A1 | 1/2005 | Sueyoshi | | |
| 2006/0056044 A1 | 3/2006 | Iwasawa | | |
| 2006/0274426 A1 | 12/2006 | Sueyoshi | | |
| 2007/0070513 A1 * | 3/2007 | Yamashita et al. | .......... | 359/676 |
| 2007/0139786 A1 | 6/2007 | Iwasawa | | |
| 2008/0094709 A1 * | 4/2008 | Iwasawa | .......... | 359/557 |

FOREIGN PATENT DOCUMENTS

| | | |
|---|---|---|
| JP | 2004-354869 | 12/2004 |
| JP | 2004-354871 | 12/2004 |
| JP | 2005-084285 | 3/2005 |
| JP | 2006-071993 | 3/2006 |
| WO | WO 2009/133736 | * 11/2009 |

* cited by examiner

Primary Examiner — Jordan Schwartz
(74) Attorney, Agent, or Firm — Kenyon & Kenyon LLP

(57) ABSTRACT

A zoom lens includes, in order from the object side thereof, a first lens unit having a positive refracting power, a second lens unit having a negative refracting power, a third lens unit having a positive refracting power, a fourth lens unit having a positive refracting power, and a fifth lens unit having a negative refracting power. During zooming from the wide angle end to the telephoto end, the first lens unit and the third lens unit are kept stationary with respect to the image plane, and at least the second lens unit and the fourth lens unit move. The first lens unit includes, in order from the object side, a first sub unit having a negative refracting power, a reflecting optical element that bends an optical path by reflection, and a second sub unit having a positive refracting power. The second sub unit includes a cemented lens.

24 Claims, 17 Drawing Sheets

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2008-300360 filed on Nov. 26, 2008; the entire contents of which are incorporated herein by reference.

BACKGROUND OF THE INVENTION

1. Field of the Invention

The present invention relates to a zoom lens suitable for use in a compact digital camera and to an image pickup apparatus equipped with the same.

2. Description of the Related Art

In recent years, various categories of digital cameras (or electronic cameras) ranging from portable popular-priced cameras to professional-use high-function cameras have been developed. In the category of portable popular-priced cameras, among them, there has arisen a demand for technologies that realize inexpensive video cameras and digital cameras that are small in depth, have good usability, and have a high zoom ratio covering a wide focal length range from the wide angle end to the telephoto end while achieving good image quality.

The most serious bottleneck in sliming a camera with respect to the depth direction is the optical system, in particular the thickness of the zoom lens system, that is, the distance from the lens surface closest to the object side to the image plane. The main trend in the field of technologies for slimming the camera body is to use what is called a collapsible lens barrel in which the optical system extends from the camera body when in use and collapses to be housed in the camera body when not in use. However, in the case where a collapsible lens barrel is used, it takes a significant time to extend the lens barrel from its housed state to the state ready for use. This is not desirable from the viewpoint of usability. In addition, having a movable front most lens unit (i.e. the lens unit closest to the object side) is undesirable from the viewpoint of water/dust resistance.

In recent years, there have been developed optical systems having an optical path (or optical axis) that is bent by a reflecting optical member such as a mirror or a prism to achieve a camera that is advantageous from the viewpoint of water/dust resistance and very small in depth, and can be ready for use in a camera without taking start-up time (to extend the lens) that is required in the case of the collapsible lens barrel. In such optical systems, the lens unit closest to the object side is a fixed lens unit that does not change its position, and the aforementioned reflecting optical member is provided in this lens unit, whereby the optical path after the reflecting optical member is deflected to extend in a horizontal or vertical direction of the camera body to make the depth as small as possible.

On the other hand, in video cameras and digital cameras categorized in the portable type, although the optical system generally has an angle of view of about 30 degrees at the wide angle end, optical systems having a wider angle of view are desired to extend the shooting situations. Examples of the zoom lens using a bent optical system include those described in Japanese Patent Application No. 2004-354871 and No. 2004-354869.

SUMMARY OF THE INVENTION

A zoom lens according to the present invention comprises, in order from the object side thereof:
  a first lens unit having a positive refracting power;
  a second lens unit having a negative refracting power;
  a third lens unit having a positive refracting power;
  a fourth lens unit having a positive refracting power; and
  a fifth lens unit having a negative refracting power, wherein
    during zooming from the wide angle end to the telephoto end, the first lens unit and the third lens unit are kept stationary with respect to an image plane, and at least the second lens unit and the fourth lens unit move,
    the first lens unit comprises, in order from the object side, a first sub unit having a negative refracting power, a reflecting optical element that bends an optical path by reflection, and a second sub unit having a positive refracting power, and
    the second sub unit comprises a cemented lens.

An image pickup apparatus according to the present invention comprises:
  the above-described zoom lens; and
  an image pickup element disposed on the image side of the zoom lens and converting an optical image formed by the zoom lens into an electrical signal.

DETAILED DESCRIPTION OF THE INVENTION

Figure 1A:
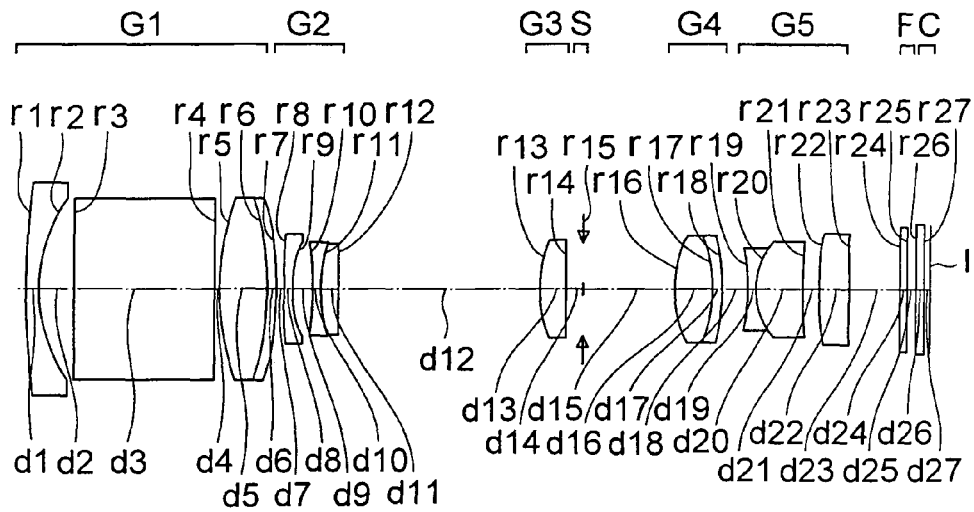
FIGS. 1A, 1B, and 1C are cross sectional views of a zoom lens according to a first embodiment of the present invention in the state in which the zoom lens is focused on an object point at infinity respectively at the wide angle end (FIG. 1A), in an intermediate state (FIG. 1B), and at the telephoto end (FIG. 1C)

The zoom lens according to the present invention includes, in order from the object side thereof, a first lens unit having a positive refracting power, a second lens unit having a negative refracting power, a third lens unit having a positive refracting power, a fourth lens unit having a positive refracting power, and a fifth lens unit having a negative refracting power, wherein during zooming from the wide angle end to the telephoto end, the first lens unit and the third lens unit are kept stationary with respect to the image plane, and at least the second lens unit and the fourth lens unit move, and the first lens unit includes, in order from the object side, a first sub unit having a negative refracting power, a reflecting optical element that bends the optical path by reflection, and a second sub unit having a positive refracting power, the second sub unit including a cemented lens.

With the above-described configuration, the optical path is bent in the first lens unit, whereby slimming in the depth direction can be achieved. In addition, by moving the second lens unit and the fourth lens unit, the magnification changing function is shared by them, whereby a high zoom ratio can be achieved. The fifth unit has a negative refracting power, and the fifth lens unit provides a magnifying effect, whereby the focal lengths of the first to fourth lens units can be made short, and the zoom lens can be made small.

An increase in the angle of view generally leads to an increase in the lens diameter and an increase in distortion. By providing a negative refracting power on the object side of the reflecting surface in the first lend unit, the lens diameter can be made small. In addition, distortion generated in the first lens unit can be cancelled by designing the fifth lens unit to have a negative refracting power.

Furthermore, the first lens unit is kept stationary with respect to the image plane. This makes it possible to start up the camera to make it ready for use without taking a significant time, and in addition, this is advantageous from the viewpoint of water/dust resistance. To achieve the compactness and high zoom ratio, it is necessary to make the refracting powers of the first sub unit having a negative refracting power and the second sub unit having a positive refracting power high. However, this will lead to an increase in chromatic coma and secondary spectrum.

In view of this, a cemented lens is used in the second sub unit having a positive refracting power to increase the zoom ratio. This enables good correction of chromatic coma at the telephoto end. Thus, deterioration in the optical performance and color blur can be prevented.

The third lens unit is kept stationary during zooming. Therefore, an aperture stop can be disposed in the vicinity of the third lens unit, whereby the lens diameter can be made small.

It is preferred that the second sub unit having a positive refracting power in the first lens unit include a cemented lens made up of a first lens element and a second lens element, and the following conditional expression (1) be satisfied:

$$|v_{11} - v_{12}| > 15 \quad (1)$$

where $v_{11}$ is the Abbe number of the first lens element, and $v_{12}$ is the Abbe number of the second lens element.

Conditional expression (1) appropriately limits the values of the Abbe numbers of the lens elements in the cemented lens in the second sub unit. If the lower limit of conditional expression (1) is exceeded, chromatic aberration cannot be corrected satisfactorily.

It is also preferred that the zoom lens according to the present invention satisfy the following conditional expression (2):

$$-0.6 < (r_1 + r_2)/(r_1 - r_2) < 0.6 \quad (2)$$

where $r_1$ is the radius of curvature of the object side surface of the cemented lens in the second sub unit, and $r_2$ is the radius of curvature of the image side surface of the cemented lens in the second sub unit.

Conditional expression (2) appropriately restricts the relationship between the radii of curvature of the object side surface and the image side surface of the cemented lens in the second sub unit. If the lower limit of conditional expression (2) is exceeded, large spherical aberration will occur at the telephoto end. If the upper limit of conditional expression (2) is exceeded, large astigmatism will occur at the wide angle end.

It is also preferred that the cemented lens in the second sub unit having a positive refracting power have a positive refracting power, and the lens element L1 having the lower refracting power among the first and second lens elements in the second sub unit satisfy the following conditional expression (3):

$$N_{dL1} > 1.68 \quad (3)$$

where $N_{dL1}$ is the refractive index of the aforementioned lens element L1 for the d-line.

Conditional expression (3) appropriately limits the value of the refractive index of the powerless lens. If the lower limit of conditional expression (3) is exceeded, it is necessary to make the curvature of a lens surface of this lens strong in order to achieve an adequate refracting power. This leads to large coma, which impairs the balance in cancellation of chromatic coma to be achieved by the cemented lens.

The cemented surface of the cemented lens in the second sub unit may be designed to be aspheric. This enables efficient correction of chromatic spherical aberration and chromatic coma.

It is also preferred that the zoom lens according to the present invention satisfy the following conditional expression (4):

$$0.8 < |f_2/f_w| < 2.0 \quad (4)$$

where $f_2$ is the focal length of the second lens unit, and $f_w$ is the focal length of the entire zoom lens system at the wide angle end.

Conditional expression (4) appropriately limits the refracting power of the second lens unit. If the second lens unit has so high a refracting power that the lower limit of conditional expression (4) is exceeded, the movement amount of the second lens unit can be made small. While this is advantageous in reducing the entire length of the zoom lens, this leads to a great increase in astigmatism and distortion and makes it difficult to achieve correction of aberrations in the entire zoom lens system. If the upper limit of conditional expression (4) is exceeded, it will be difficult to make the entire length of the zoom lens short.

It is also preferred that the zoom lens according to the present invention satisfy the following conditional expression (5):

$$2.0 < f_1/f_w < 5.0 \quad (5)$$

where $f_1$ is the focal length of the first lens unit, and $f_w$ is the focal length of the entire zoom lens system at the wide angle end.

Conditional expression (5) appropriately limits the refracting power of the first lens unit. If the upper limit of conditional expression (5) is exceeded, the entrance pupil becomes deep, which necessitates a large lens diameter. If the lower limit of conditional expression (5) is exceeded, it will be difficult to correct off-axis aberrations and chromatic aberration satisfactorily.

It is also preferred that the zoom lens according to the present invention satisfies the following conditional expression (6):

$$1.0 < |f_{1U11}|/f_w < 4.0 \quad (6)$$

where $f_{1U11}$ is the focal length of the first sub unit in the first lens unit, and $f_w$ is the focal length of the entire zoom lens system at the wide angle end.

Conditional expression (6) appropriately limits the refracting power of the negative lens in the first lens unit. In order to make the entrance pupil shallow to make bending of the optical path physically possible, it is preferred that the negative lens in the first lens unit be designed to have a high refracting power.

If the upper limit of conditional expression (6) is exceeded, the entrance pupil will remain deep, and if a somewhat large angle of view is to be achieved, it is necessary to make the diameter and size of each optical element in the first lens unit large, which makes it physically difficult to bend the optical path. If the lower limit of conditional expression (6) is exceeded, possible values of the magnification of the lens unit moved for zooming provided subsequently to the first lens unit become close to zero. This leads to disadvantages such as an increase in the movement amount or a decrease in the zoom ratio and makes it difficult to correct off-axis aberrations such as distortion and chromatic aberration.

The image pickup apparatus according to the present invention comprises any one of the zoom lenses described in the foregoing and an image pickup element disposed on the image side of the zoom lens to convert an optical image formed by the zoom lens into an electrical signal.

As described in the foregoing, the present invention can provides a zoom lens that is short in the entire length, can be ready for use in a camera without taking start-up time (to extend the lens) that is required in the case of the collapsible lens barrel, is advantageous from the viewpoint of water/dust resistance, and can be configured to have an optical path (or optical axis) that is bent by a reflecting optical member such as a prism, while achieving high optical performance such as satisfactory correction of chromatic aberration.

In the following, embodiments of the zoom lens and the image pickup apparatus according to the present invention will be described in detail with reference to the drawings. It should be understood, however, that the present invention is not limited by the embodiments.

In the following, first to sixth embodiments of the zoom lens according to the present invention will be described. FIGS. 1A, 1B and 1C to 6A, 6B and 6C are cross sectional views of the zoom lenses according to the first to the sixth embodiments respectively at the wide angle end (FIGS. 1A, 2A, 3A, 4A, 5A, and 6A), in an intermediate focal length state (FIGS. 1B, 2B, 3B, 4B, 5B, and 6B), and at the telephoto end (FIGS. 1C, 2C, 3C, 4C, 5C, and 6C) in the state in which the zoom lenses are focused on an object point at infinity. In FIGS. 1A through 6C, a first lens unit is denoted by G1, a second lens unit is denoted by G2, an aperture stop is denoted by S, a third lens unit is denoted by G3, a fourth lens unit is denoted by G4, a fifth lens unit is denoted by G5, a sixth lens unit is denoted by G6, a plane parallel plate having wavelength range restriction coating applied thereon that blocks or reduces infrared light, constituting a low pass filter is denoted by F, a plane parallel plate constituting a cover glass for an electronic image pickup element is denoted by C, and the image plane is denoted by I. The cover glass C may have multi-layer coating for wavelength range restriction applied on its surface. The cover glass C may be designed to have the function of a low pass filter.

In all the embodiments, the first lens unit G1, the third lens unit G3, and the aperture stop S are fixed. All the numerical data presented below are for the state in which the zoom lens is focused on an object at infinity. In the numerical data, dimensions are in mm (millimeters) and angles are in degrees. Zoom data will be presented for the wide angle end (WE), the intermediate focal length state (ST) defined in connection with the present invention, and the telephoto end (TE).

Figure 1B:
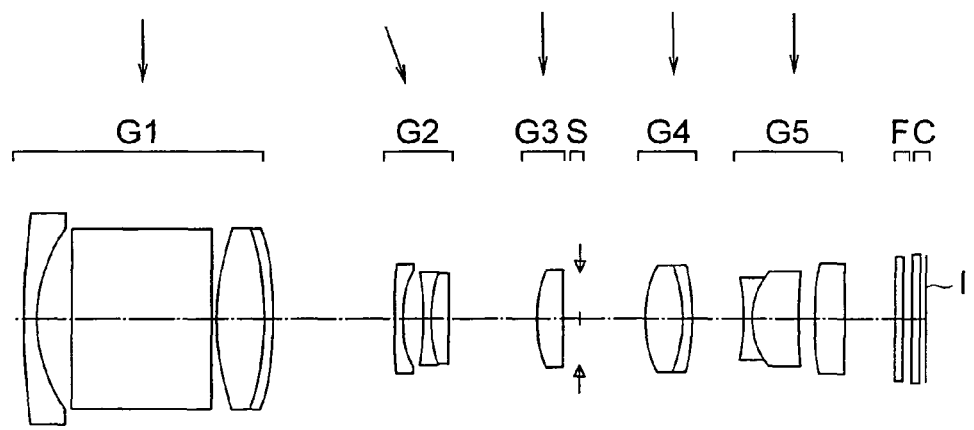
Figure 1C:
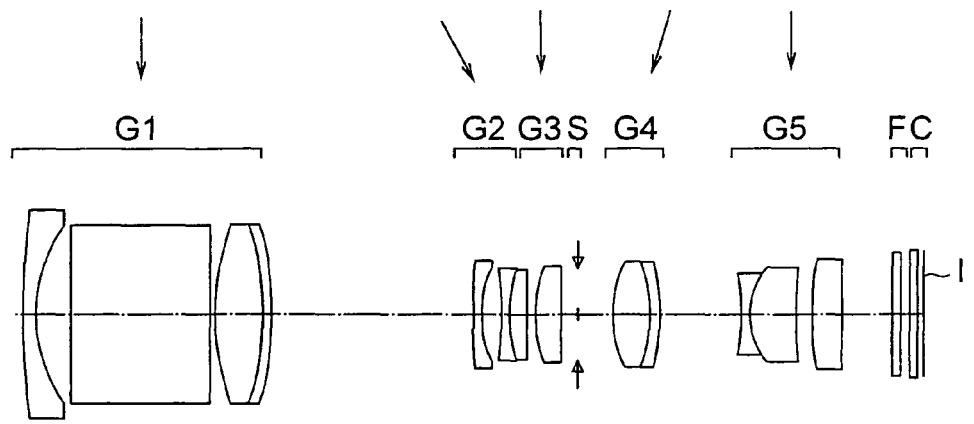

As shown in FIGS. 1A, 1B, and 1C, the zoom lens according to the first embodiment includes, in order from the object side thereof, a first lens unit G1 having a positive refracting power, a second lens unit G2 having a negative refracting power, a third lens unit G3 having a positive refracting power, an aperture stop S, a fourth lens unit G4 having a positive refracting power, and a fifth lens unit G5 having a negative refracting power.

During zooming from the wide angle end to the telephoto end, the first lens unit G1 is kept stationary, the second lens unit G2 moves toward the image side, the third lens unit G3 is kept stationary, the fourth lens unit G4 moves toward the object side, and the fifth lens unit G5 is kept stationary.

The first lens unit G1 is composed of a negative meniscus lens having a convex surface directed toward the object side, a prism (or a reflecting optical element for bending the optical path), and a cemented lens made up of a biconvex positive lens and a negative meniscus lens having a convex surface directed toward the image side. The second lens unit G2 is composed of a negative meniscus lens having a convex surface directed toward the object side, and a cemented lens made up of a biconcave negative lens and a positive meniscus lens having a convex surface directed toward the object side. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a biconcave negative lens and a positive meniscus lens having a convex surface directed toward the object side, and a biconvex positive lens. All the lens elements in each lens unit G1, G2, G3, G4, G5 are arranged in the mentioned order from the object side.

The following six lens surfaces are aspheric surfaces: the three surfaces of the cemented lens in the first lens unit G1, both surfaces of the biconvex positive lens in the third lens unit G3, and the object side surface of the biconvex positive lens in the fourth lens unit G4.

Figure 2A:
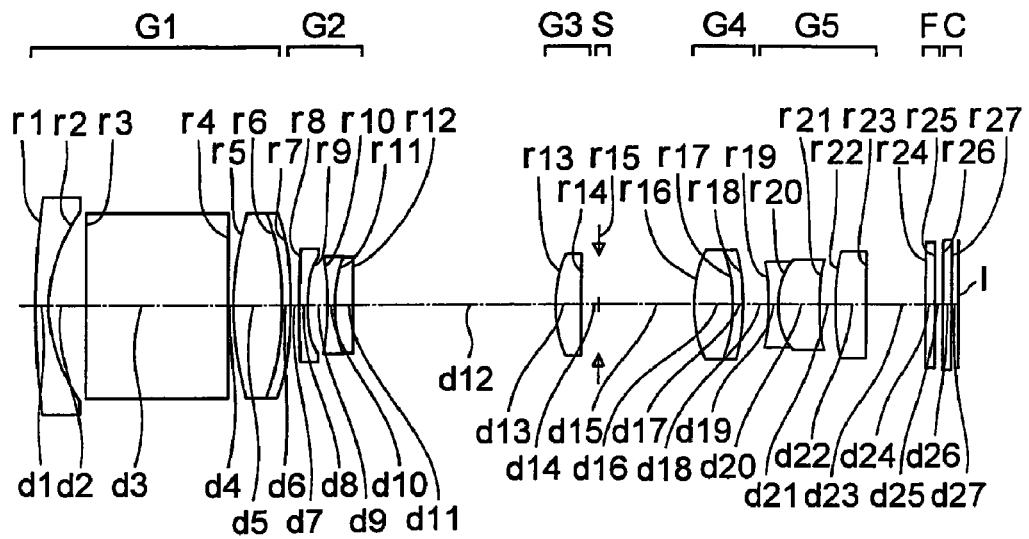
FIGS. 2A, 2B, and 2C are cross sectional views similar to FIGS. 1A, 1B, and 1C showing a zoom lens according to a second embodiment of the present invention.
Figure 2B:
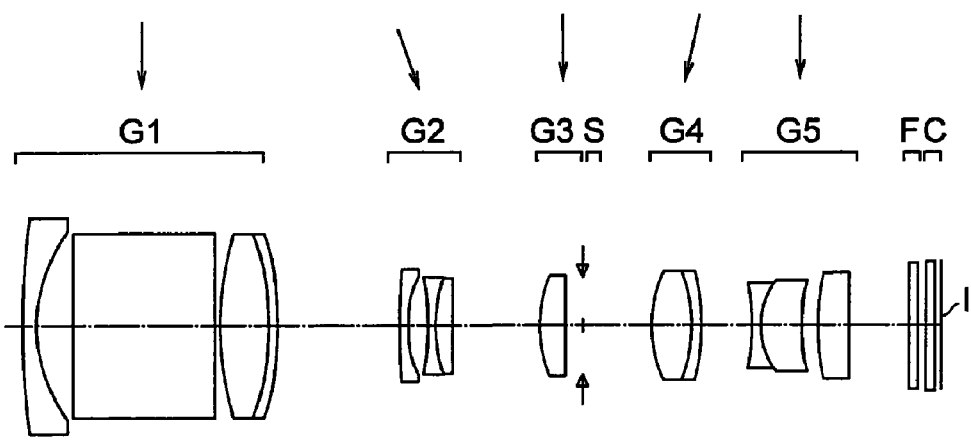
Figure 2C:
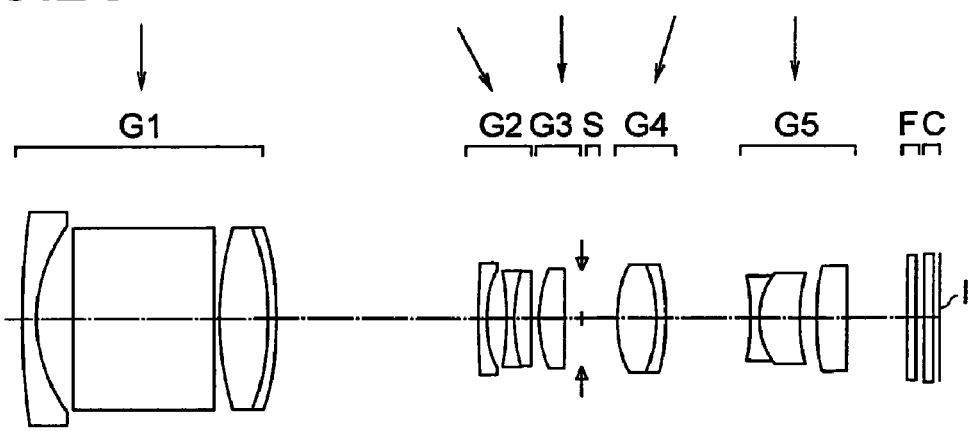

As shown in FIGS. 2A, 2B, and 2C, the zoom lens according to the second embodiment includes, in order from the object side thereof, a first lens unit G1 having a positive refracting power, a second lens unit G2 having a negative refracting power, a third lens unit G3 having a positive refracting power, an aperture stop S, a fourth lens unit G4 having a positive refracting power, and a fifth lens unit G5 having a negative refracting power.

During zooming from the wide angle end to the telephoto end, the first lens unit G1 is kept stationary, the second lens unit G2 moves toward the image side, the third lens unit G3 is kept stationary, the fourth lens unit G4 moves toward the object side, and the fifth lens unit G5 is kept stationary.

The first lens unit G1 is composed of a negative meniscus lens having a convex surface directed toward the object side, a prism (or a reflecting optical element for bending the optical path), and a cemented lens made up of a biconvex positive lens and a negative meniscus lens having a convex surface directed toward the image side. The second lens unit G2 is composed of a negative meniscus lens having a convex surface directed toward the object side, and a cemented lens made up of a biconcave negative lens and a positive meniscus lens having a convex surface directed toward the object side. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a biconcave negative lens and a positive meniscus lens having a convex surface directed toward the object side, and a biconvex positive lens. All the lens elements in each lens unit G1, G2, G3, G4, G5 are arranged in the mentioned order from the object side.

The following six lens surfaces are aspheric surfaces: the three surfaces of the cemented lens in the first lens unit G1, both surfaces of the biconvex positive lens in the third lens unit G3, and the object side surface of the biconvex positive lens in the fourth lens unit G4.

Figure 3A:
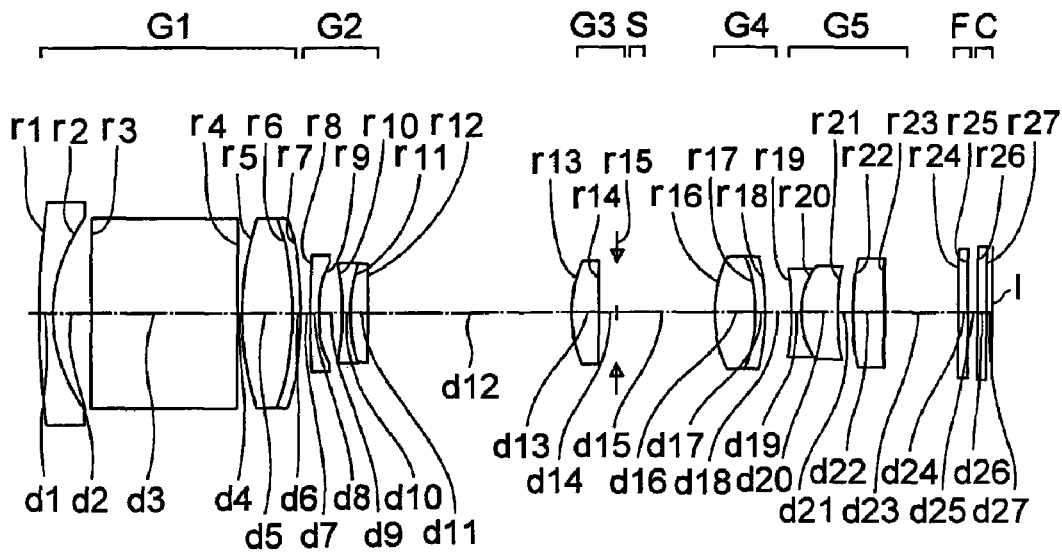
FIGS. 3A, 3B, and 3C are cross sectional views similar to FIGS. 1A, 1B, and 1C showing a zoom lens according to a third embodiment of the present invention.
Figure 3B:
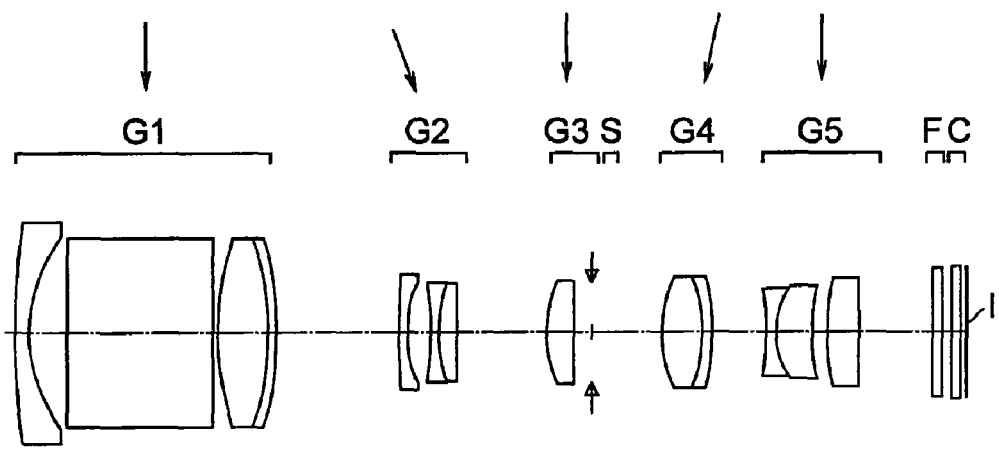
Figure 3C:
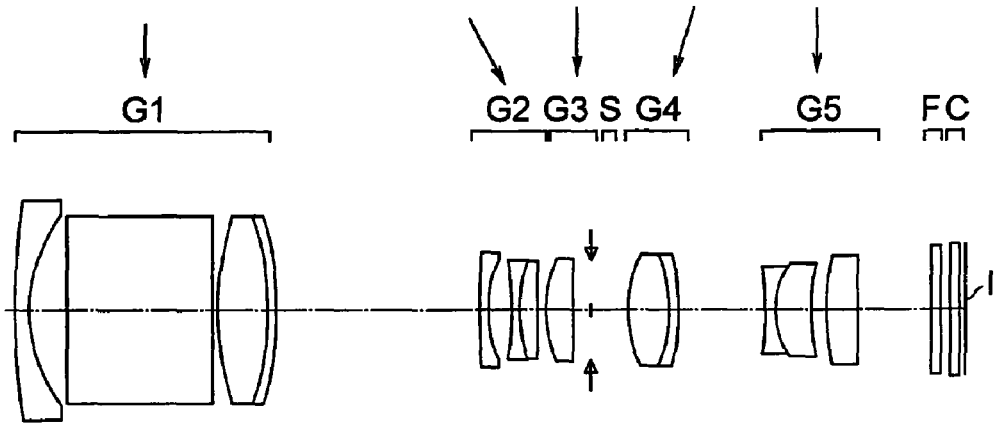

As shown in FIGS. 3A, 3B, and 3C, the zoom lens according to the third embodiment includes, in order from the object side thereof, a first lens unit G1 having a positive refracting power, a second lens unit G2 having a negative refracting power, a third lens unit, G3 having a positive refracting power, an aperture stop S, a fourth lens unit G4 having a positive refracting power, and a fifth lens unit G5 having a negative refracting power.

During zooming from the wide angle end to the telephoto end, the first lens unit G1 is kept stationary, the second lens unit G2 moves toward the image side, the third lens unit G3 is kept stationary, the fourth lens unit G4 moves toward the object side, and the fifth lens unit G5 is kept stationary.

The first lens unit G1 is composed of a negative meniscus lens having a convex surface directed toward the object side, a prism (or a reflecting optical element for bending the optical path), and a cemented lens made up of a biconvex positive lens and a negative meniscus lens having a convex surface directed toward the image side. The second lens unit G2 is composed of a negative meniscus lens having a convex surface directed toward the object side, and a cemented lens made up of a biconcave negative lens and a positive meniscus lens having a convex surface directed toward the object side. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a biconcave negative lens and a positive meniscus lens having a convex surface directed toward the object side, and a biconvex positive lens. All the lens elements in each lens unit G1, G2, G3, G4, G5 are arranged in the mentioned order from the object side.

The following six lens surfaces are aspheric surfaces: the three surfaces of the cemented lens in the first lens unit G1, both surfaces of the biconvex positive lens in the third lens unit G3, and the object side surface of the biconvex positive lens in the fourth lens unit G4.

Figure 4A:
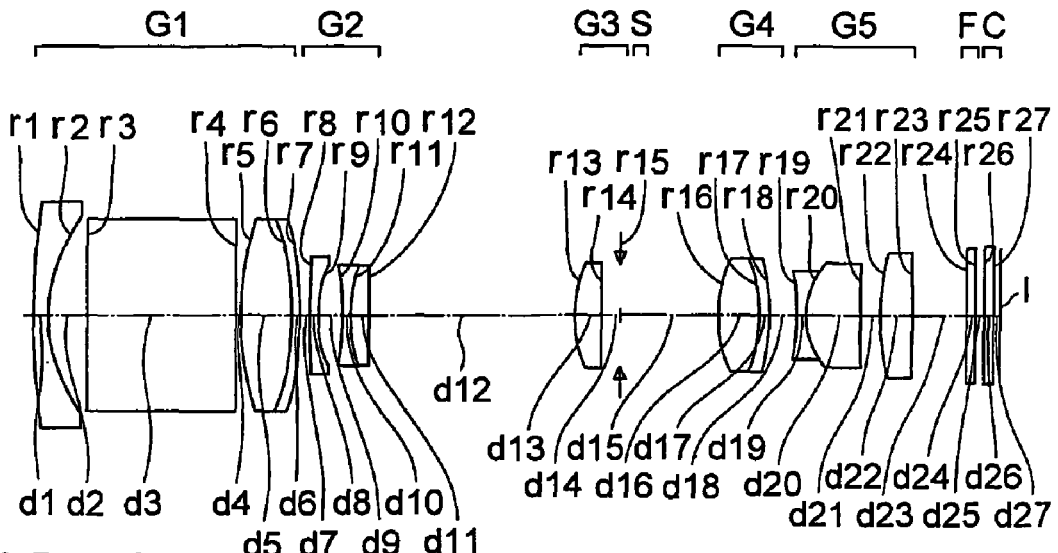
FIGS. 4A, 4B, and 4C are cross sectional views similar to FIGS. 1A, 1B, and 10 showing a zoom lens according to a fourth embodiment of the present invention.
Figure 4B:
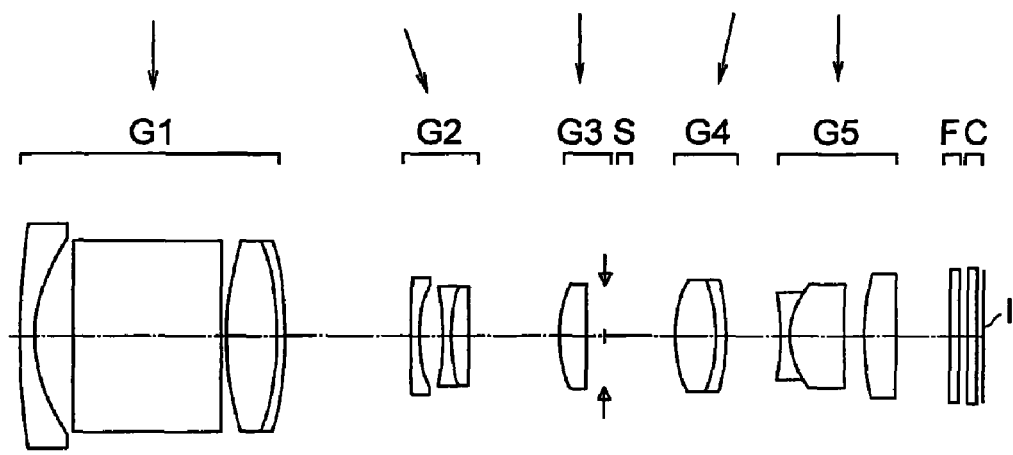
Figure 4C:
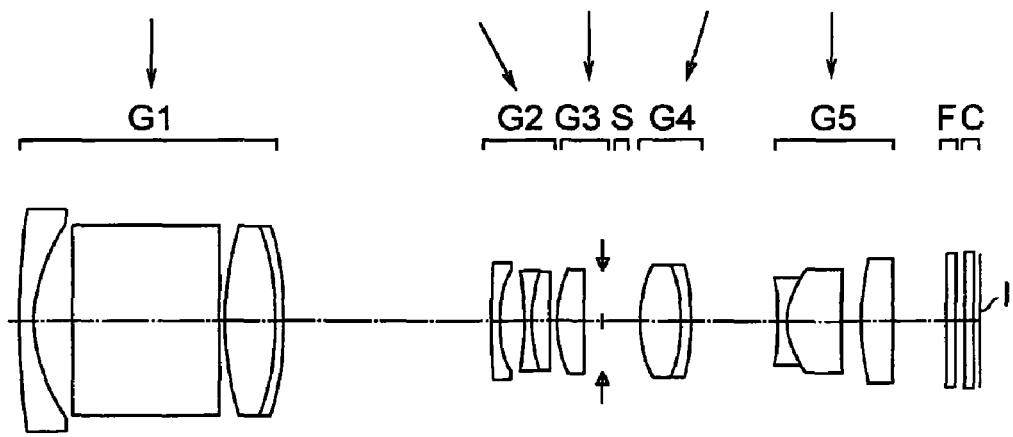

As shown in FIGS. 4A, 4B, and 4C, the zoom lens according to the fourth embodiment includes, in order from the object side thereof, a first lens unit G1 having a positive refracting power, a second lens unit G2 having a negative refracting power, a third lens unit G3 having a positive refracting power, an aperture stop S, a fourth lens unit G4 having a positive refracting power, and a fifth lens unit G5 having a negative refracting power.

During zooming from the wide angle end to the telephoto end, the first lens unit G1 is kept stationary, the second lens unit G2 moves toward the image side, the third lens unit G3 is kept stationary, the fourth lens unit G4 moves toward the object side, and the fifth lens unit G5 is kept stationary.

The first lens unit G1 is composed of a negative meniscus lens having a convex surface directed toward the object side, a prism (or a reflecting optical element for bending the optical path), and a cemented lens made up of a biconvex positive lens and a negative meniscus lens having a convex surface directed toward the image side. The second lens unit G2 is composed of a negative meniscus lens having a convex surface directed toward the object side, and a cemented lens made up of a biconcave negative lens and a positive meniscus lens having a convex surface directed toward the object side. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a biconcave negative lens and a positive meniscus lens having a convex surface directed toward the object side, and a biconvex positive lens. All the lens elements in each lens unit G1, G2, G3, G4, G5 are arranged in the mentioned order from the object side.

The following five lens surfaces are aspheric surfaces: the object side surface of the biconvex positive lens in the first lens unit G1, the image side surface of the negative meniscus lens closest to the image side in the first lens unit G1, both surfaces of the biconvex positive lens in the third lens unit G3, and the object side surface of the biconvex positive lens in the fourth lens unit G4.

Figure 5A:
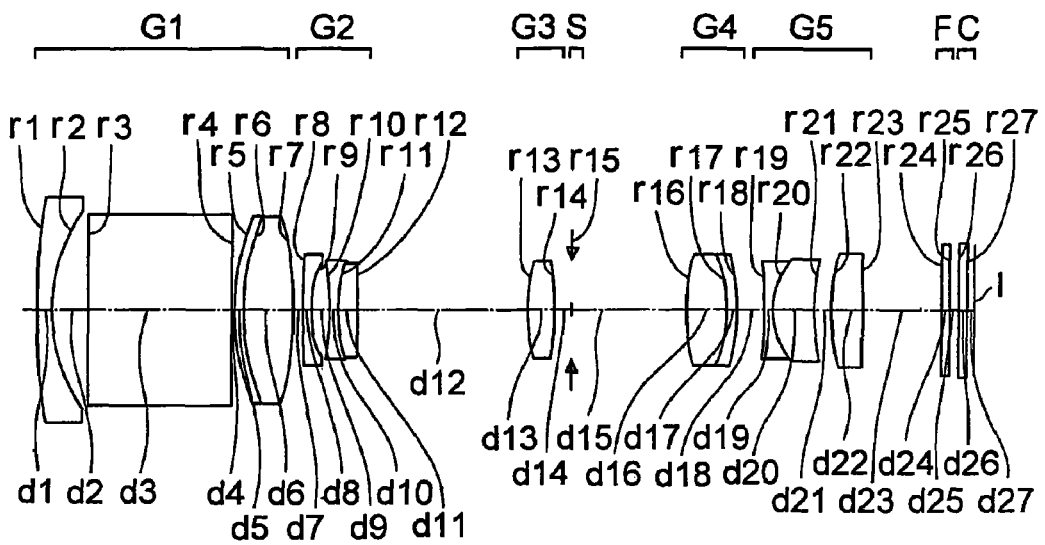
FIGS. 5A, 5B, and 5C are cross sectional views similar to FIGS. 1A, 1B, and 10 showing a zoom lens according to a fifth embodiment of the present invention.
Figure 5B:
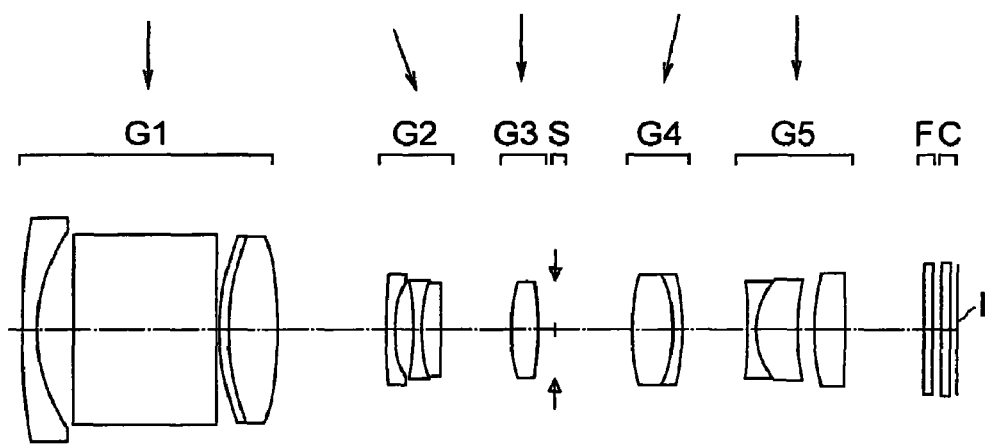
Figure 5C:
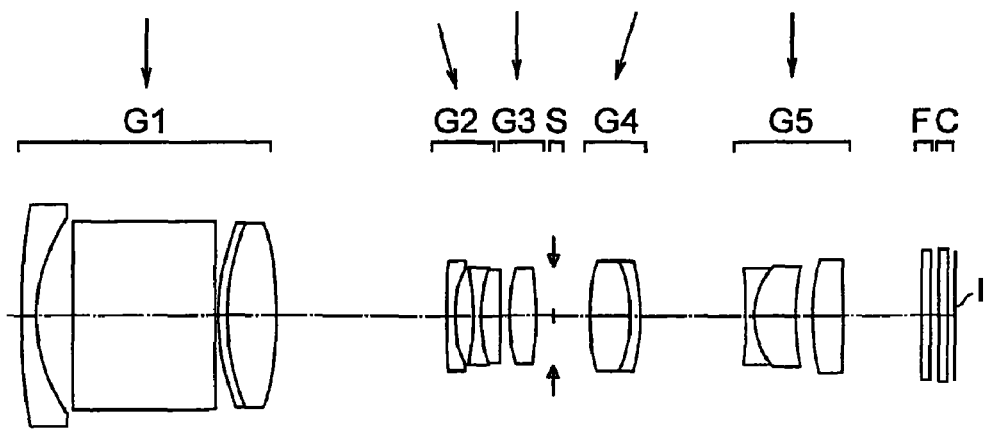

As shown in FIGS. 5A, 5B, and 5C, the zoom lens according to the fifth embodiment includes, in order from the object side thereof, a first lens unit G1 having a positive refracting power, a second lens unit G2 having a negative refracting power, a third lens unit G3 having a positive refracting power, an aperture stop S, a fourth lens unit G4 having a positive refracting power, and a fifth lens unit G5 having a negative refracting power.

During zooming from the wide angle end to the telephoto end, the first lens unit G1 is kept stationary, the second lens unit G2 moves toward the image side, the third lens unit G3 is kept stationary, the fourth lens unit G4 moves toward the object side, and the fifth lens unit G5 is kept stationary.

The first lens unit G1 is composed of a negative meniscus lens having a convex surface directed toward the object side, a prism (or a reflecting optical element for bending the optical path), and a cemented lens made up of a positive meniscus lens having a convex surface directed toward the object side and a biconvex positive lens. The second lens unit G2 is composed of a negative meniscus lens having a convex surface directed toward the object side, and a cemented lens made up of a biconcave negative lens and a biconvex positive lens. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a biconcave negative lens and a positive meniscus lens having a convex surface directed toward the object side, and a biconvex positive lens. All the lens elements in each lens unit G1, G2, G3, G4, G5 are arranged in the mentioned order from the object side.

The following six lens surfaces are aspheric surfaces: the three surfaces of the cemented lens in the first lens unit G1, both surfaces of the biconvex positive lens in the third lens unit G3, and the object side surface of the biconvex positive lens in the fourth lens unit G4.

Figure 6A:
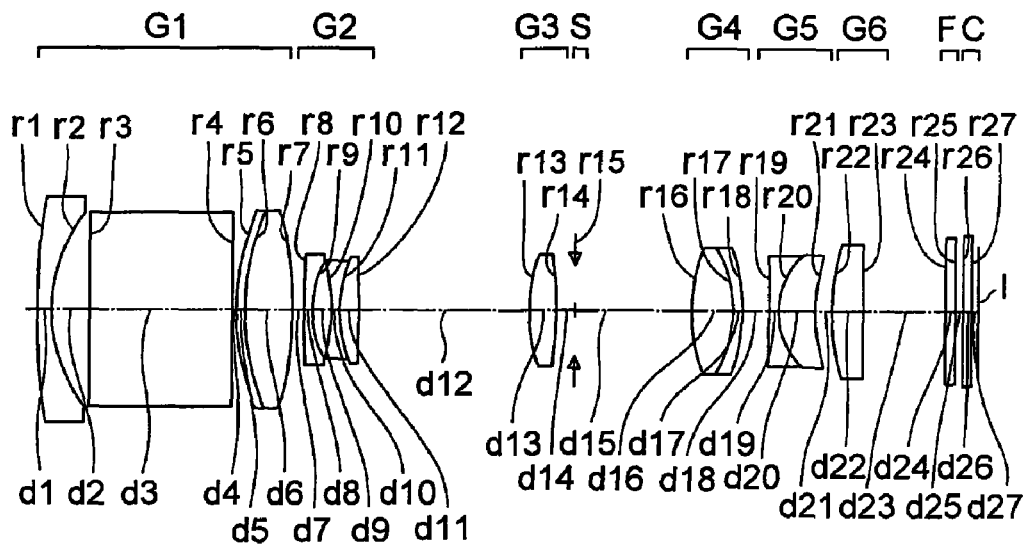
FIGS. 6A, 6B, and 6C are cross sectional views similar to FIGS. 1A, 1B, and 10 showing a zoom lens according to a sixth embodiment of the present invention.
Figure 6B:
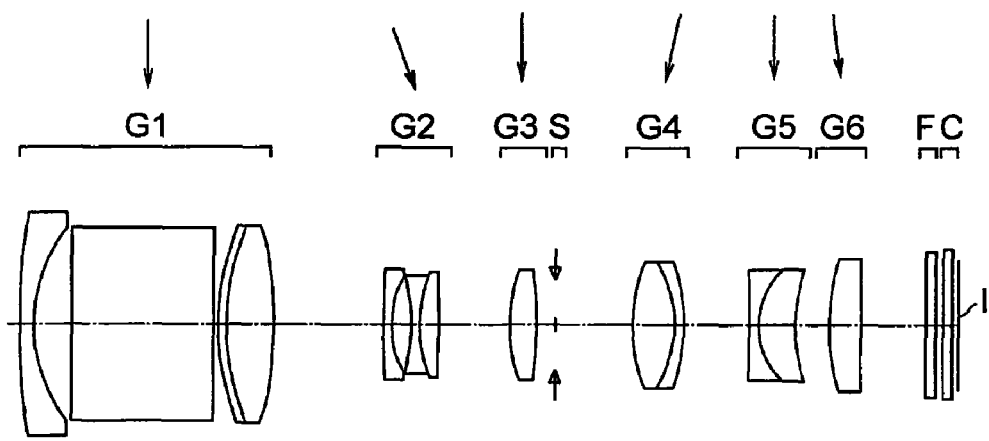
Figure 6C:
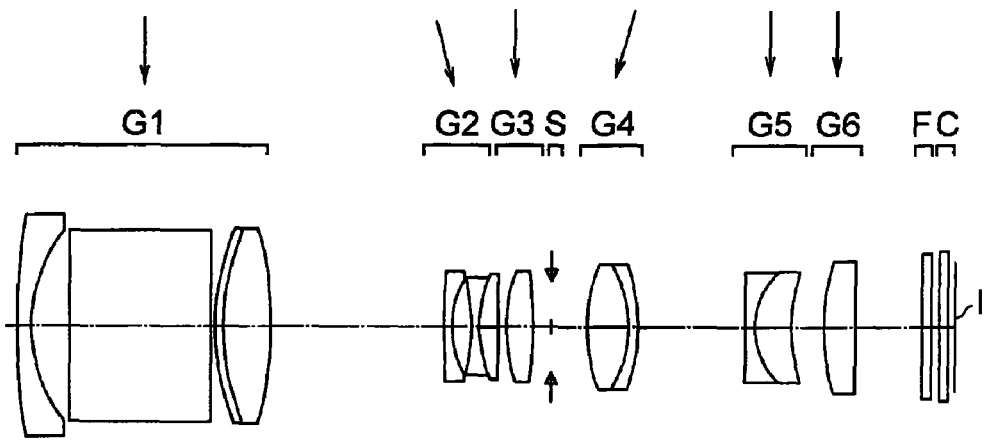
Figure 7A:
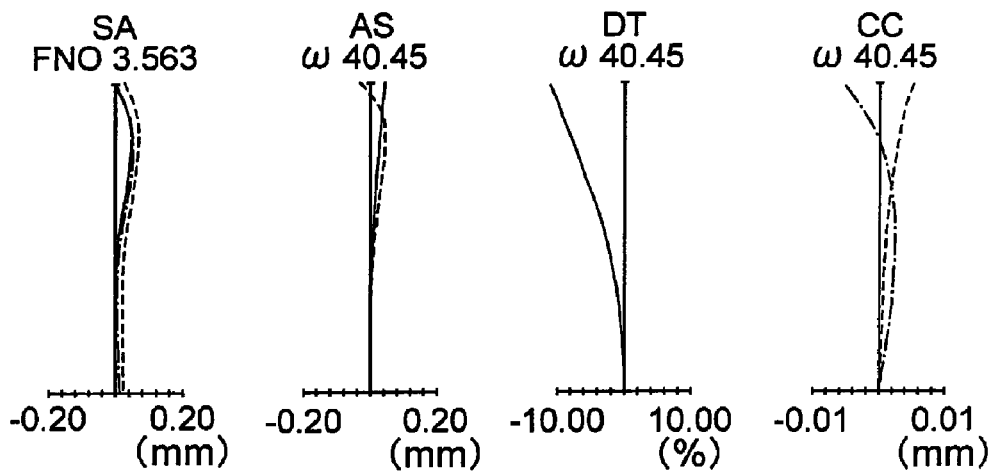
FIGS. 7A, 7B, and 7C are diagrams showing spherical aberration, astigmatism, distortion, and chromatic aberration of magnification of the zoom lens according to the first embodiment in the state in which the zoom lens is focused on an object point at infinity respectively at the wide angle end (FIG. 7A), in the intermediate state (FIG. 7B), and the telephoto end (FIG. 7C)
Figure 7B:
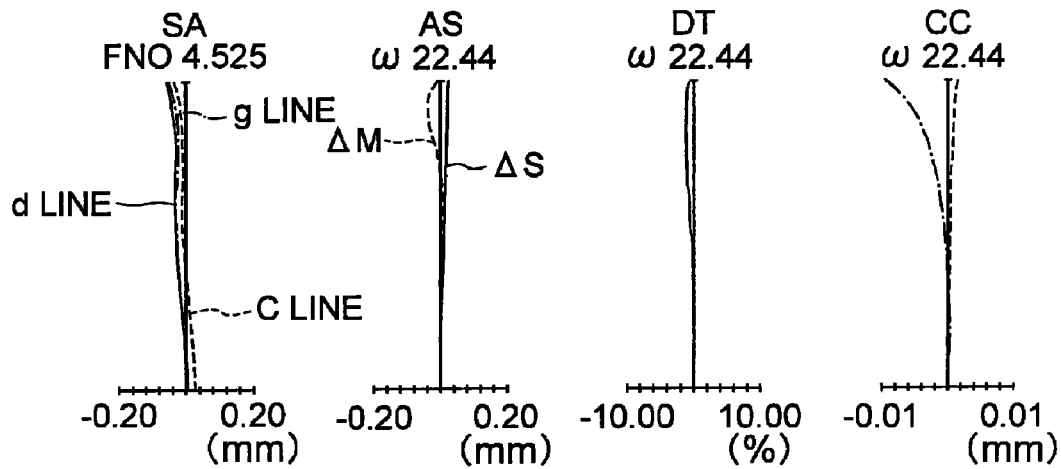
Figure 7C:
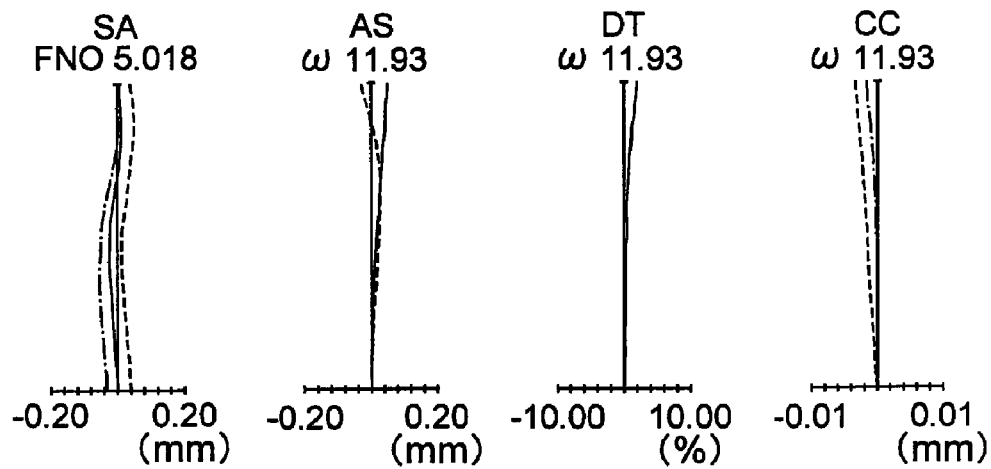
Figure 8A:
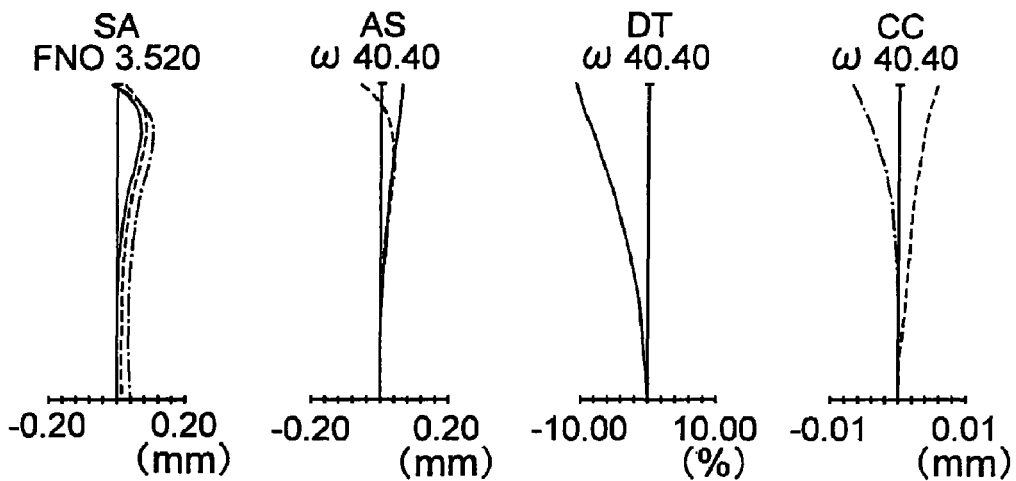
FIGS. 8A, 8B, and 8C are diagrams similar to FIGS. 7A, 7B, and 7C showing aberrations of the zoom lens according to the second embodiment in the state in which the zoom lens is focused on an object point at infinity.
Figure 8B:
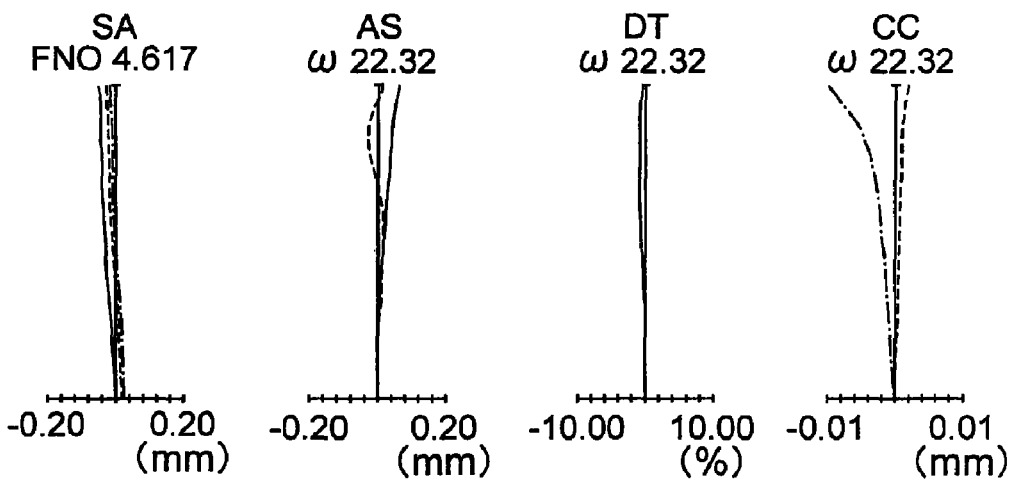
Figure 8C:
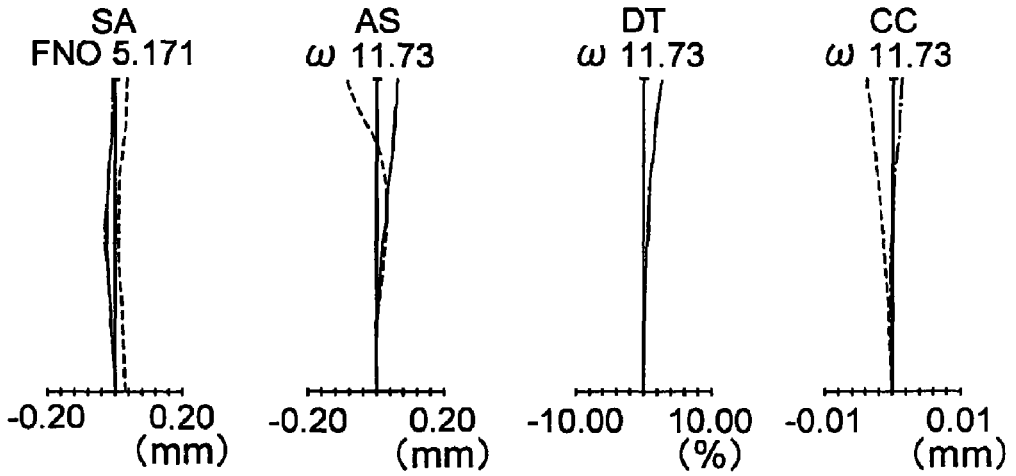
Figure 9A:
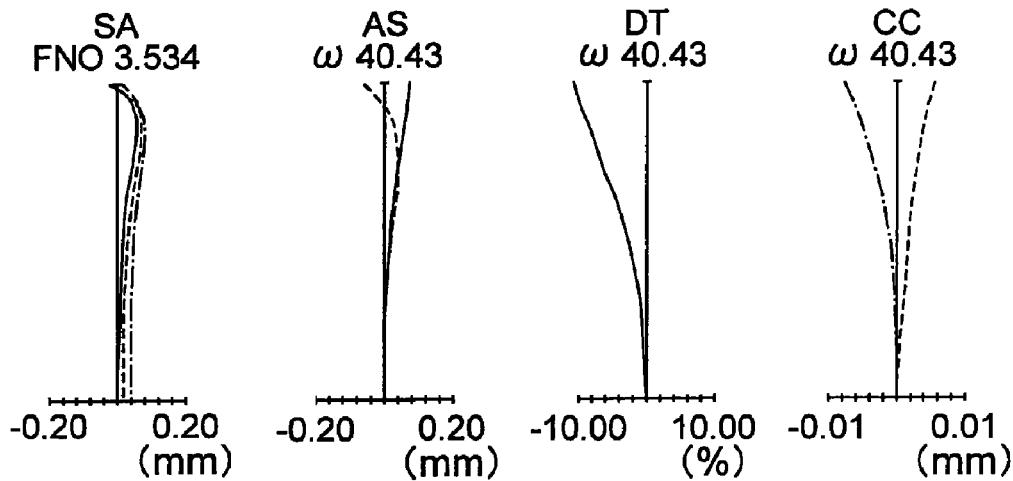
FIGS. 9A, 9B, and 9C are diagrams similar to FIGS. 7A, 7B, and 7C showing aberrations of the zoom lens according to the third embodiment in the state in which the zoom lens is focused on an object point at infinity.
Figure 9B:
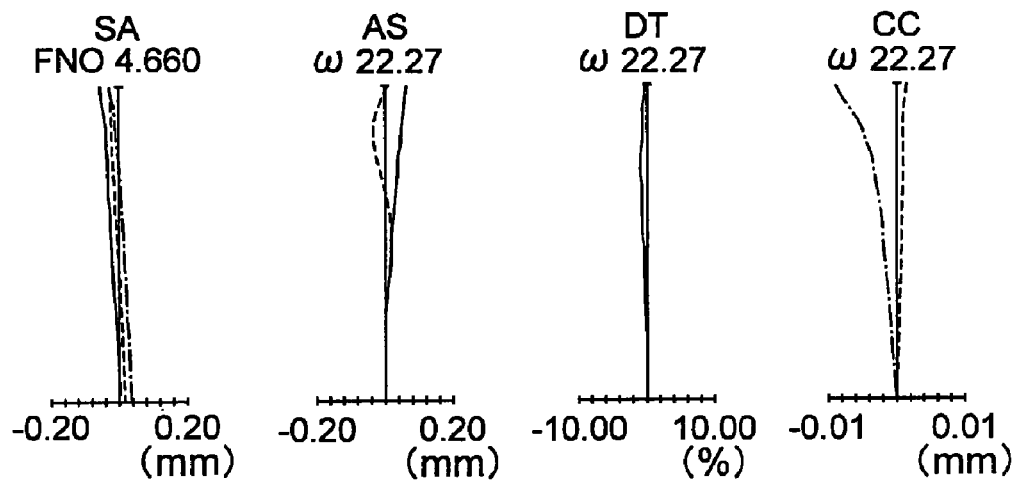
Figure 9C:
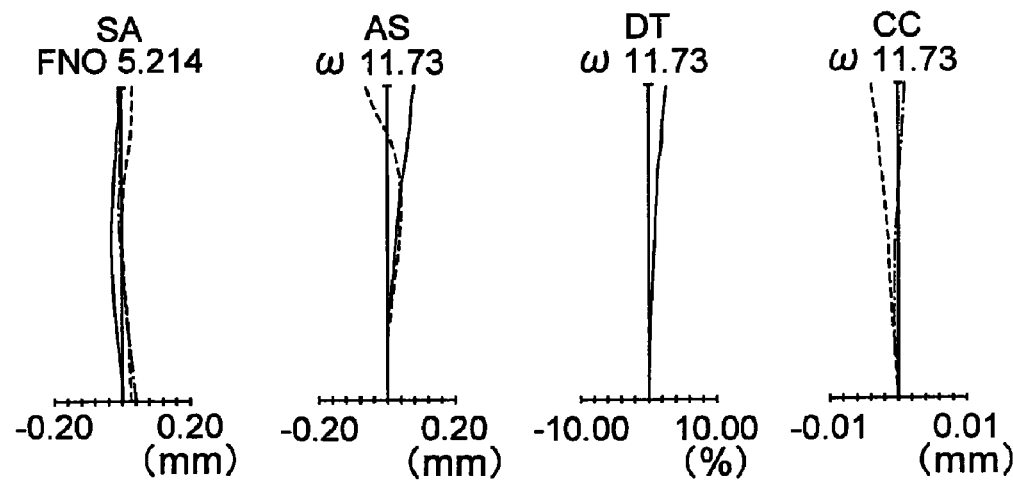
Figure 10A:
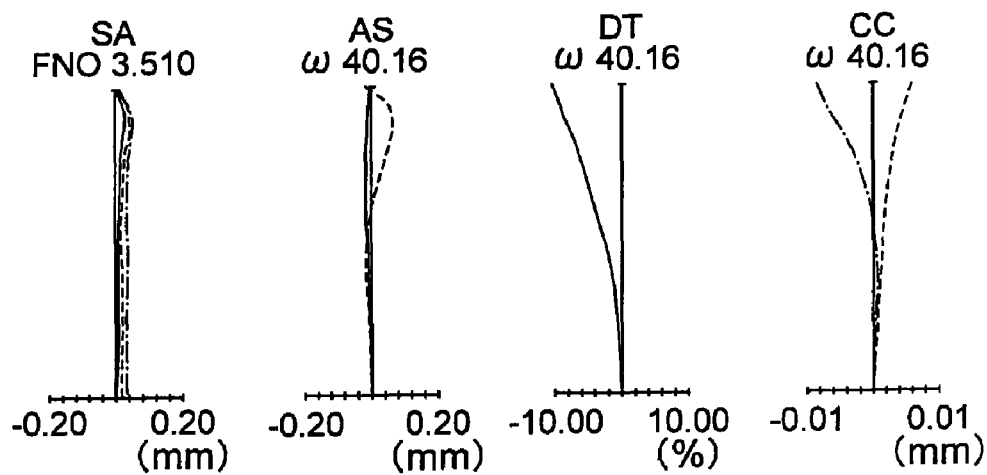
FIGS. 10A, 10B, and 10C are diagrams similar to FIGS. 7A, 7B, and 7C showing aberrations of the zoom lens according to the fourth embodiment in the state in which the zoom lens is focused on an object point at infinity.
Figure 10B:
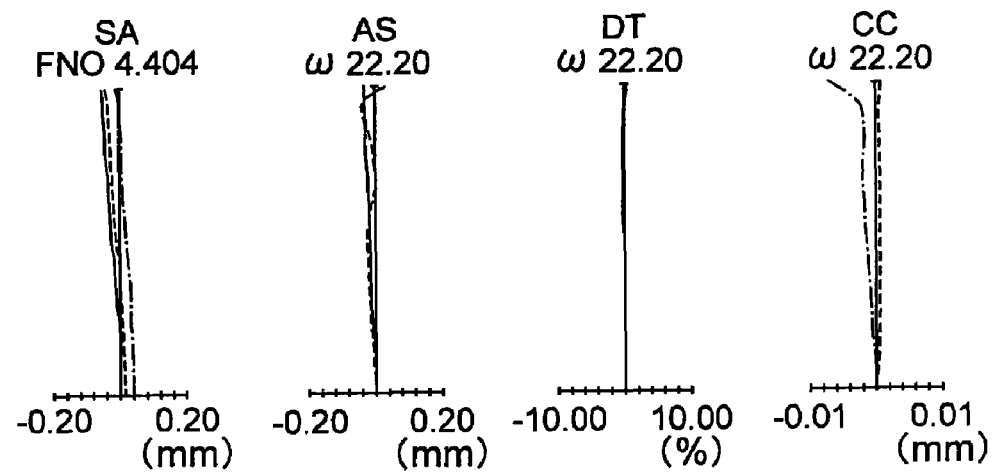
Figure 10C:
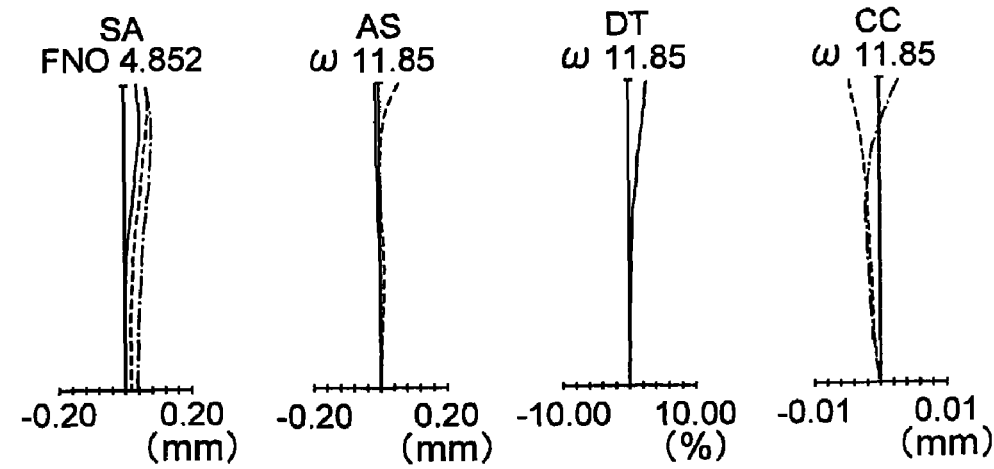
Figure 11A:
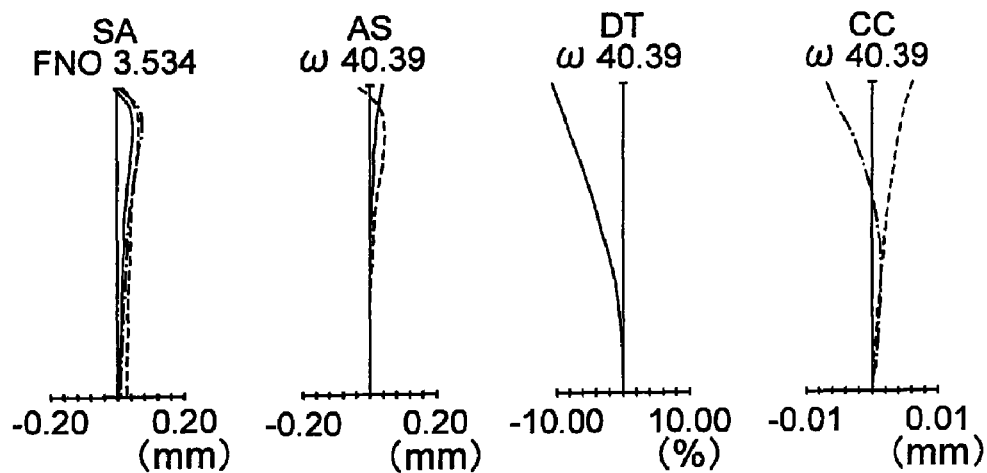
FIGS. 11A, 11B, and 11C are diagrams similar to FIGS. 7A, 7B, and 7C showing aberrations of the zoom lens according to the fifth embodiment in the state in which the zoom lens is focused on an object point at infinity.
Figure 11B:
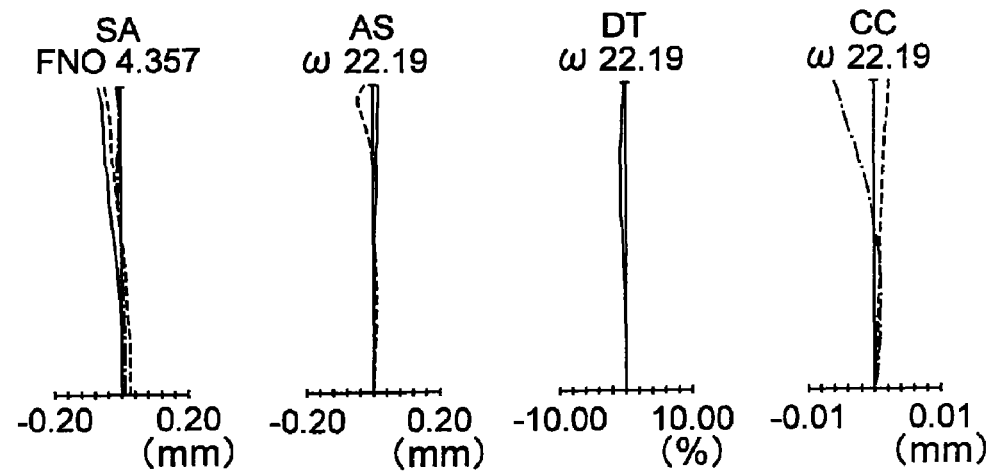
Figure 11C:
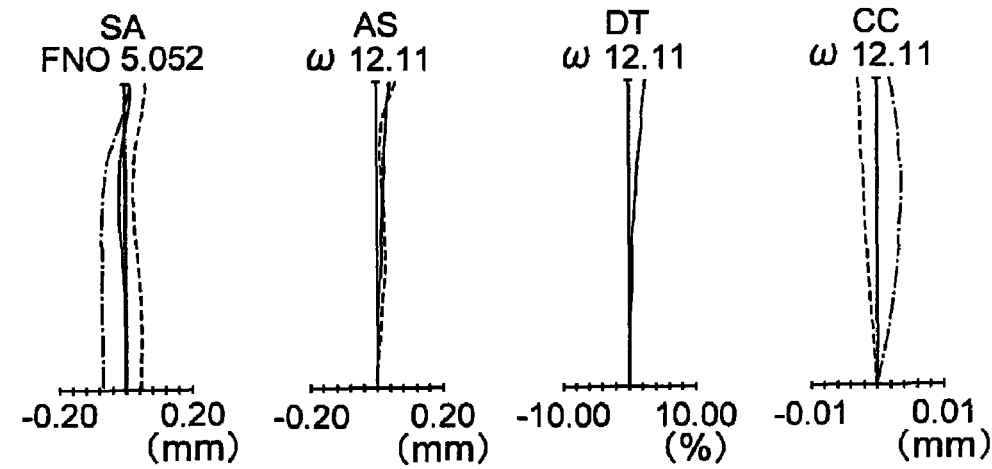
Figure 12A:
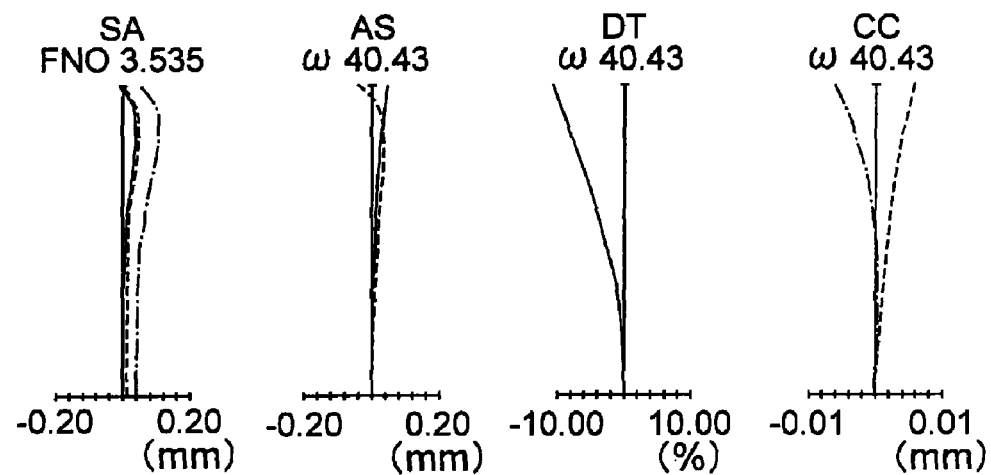
FIGS. 12A, 12B, and 12C are diagrams similar to FIGS. 7A, 7B, and 7C showing aberrations of the zoom lens according to the sixth embodiment in the state in which the zoom lens is focused on an object point at infinity.
Figure 12B:
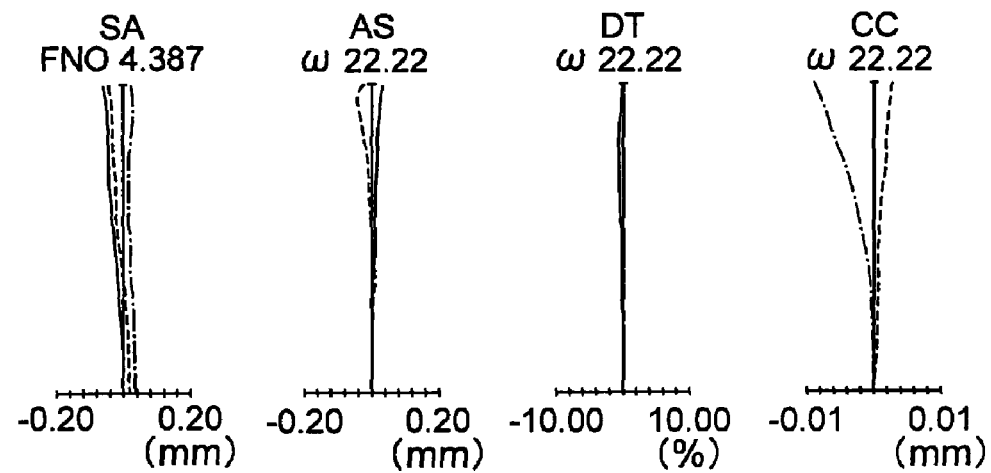
Figure 12C:
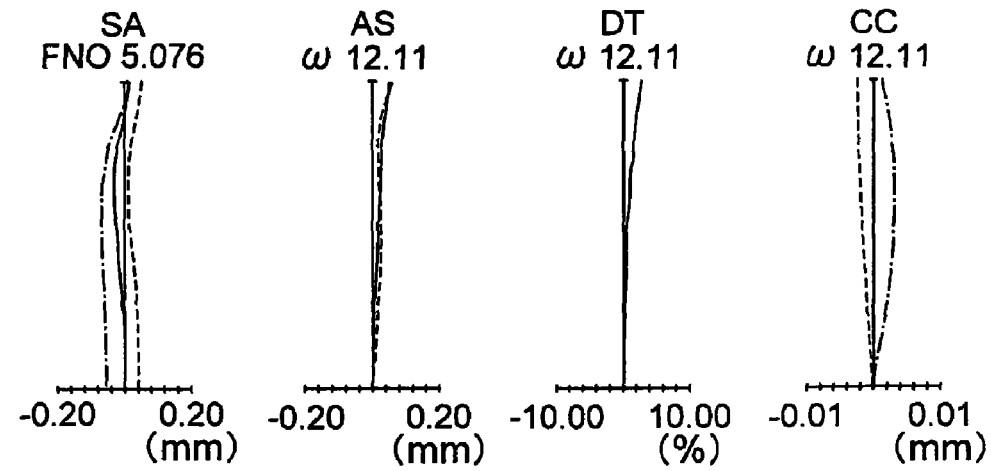

As shown in FIGS. 6A, 6B, and 6C, the zoom lens according to the sixth embodiment includes, in order from the object side thereof, a first lens unit G1 having a positive refracting power, a second lens unit G2 having a negative refracting power, a third lens unit G3 having a positive refracting power, an aperture stop S, a fourth lens unit G4 having a positive refracting power, a fifth lens unit G5 having a negative refracting power, and a sixth lens unit G6 having a positive refracting power.

During zooming from the wide angle end to the telephoto end, the first lens unit G1 is kept stationary, the second lens unit G2 moves toward the image side, the third lens unit G3 is kept stationary, the fourth lens unit G4 moves toward the object side, the fifth lens unit G5 moves first toward the image side and thereafter toward the object side, and the sixth lens unit G6 moves first toward the image side and thereafter toward the object side.

The first lens unit G1 is composed of a negative meniscus lens having a convex surface directed toward the object side, a prism (or a reflecting optical element for bending the optical path), and a cemented lens made up of a positive meniscus lens having a convex surface directed toward the object side and a biconvex positive lens. The second lens unit G2 is composed of a negative meniscus lens having a convex surface directed toward the object side, and a cemented lens made up of a biconcave negative lens and a biconvex positive lens. The third lens unit G3 is composed of a biconvex positive lens. The fourth lens unit G4 is composed of a cemented lens made up of a biconvex positive lens and a negative meniscus lens having a convex surface directed toward the image side. The fifth lens unit G5 is composed of a cemented lens made up of a biconcave negative lens and a positive meniscus lens having a convex surface directed toward the object side. The six lens unit G6 is composed of a biconvex positive lens. All the lens elements in each lens unit G1, G2, G3, G4, G5, G6 are arranged in the mentioned order from the object side.

The following six lens surfaces are aspheric surfaces: the three surfaces of the cemented lens in the first lens unit both surfaces of the biconvex positive lens in the third lens unit G3, and the object side surface of the biconvex positive lens in the fourth lens unit G4.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens.

When Z is let to be an optical axis with a direction of traveling of light as a positive (direction), and Y is let to be in a direction orthogonal to the optical axis, a shape of the aspheric surface is described by the following expression (I).

$$Z=(Y^2/r)/[1+\{1-(K+1)(Y/r)^2\}^{1/2}]+A_4Y^4+A_6Y^6+A_8Y^8+A_{10}Y^{10}+A_{12}Y^{12} \quad (I)$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively.

Moreover, in the aspherical surface coefficients, 'e-n' (where, n is an integral number) indicates '$10^{-n}$'.

Example 1 unit mm

Surface data

| Surface No. | r | d | nd | vd |
|---|---|---|---|---|
| Object plane | ∞ | ∞ | | |
| 1 | 60.019 | 0.80 | 2.00069 | 25.46 |
| 2 | 9.776 | 2.00 | | |
| 3 | ∞ | 8.20 | 2.00069 | 25.46 |
| 4 | ∞ | 0.30 | | |
| 5* | 15.930 | 2.83 | 1.76802 | 49.24 |
| 6* | −20.949 | 0.50 | 1.92286 | 20.88 |
| 7* | −21.297 | Variable | | |
| 8 | 49.723 | 0.50 | 1.88300 | 40.76 |
| 9 | 7.369 | 1.21 | | |
| 10 | −18.724 | 0.45 | 1.88300 | 40.76 |
| 11 | 8.949 | 1.03 | 1.92286 | 20.88 |
| 12 | 5779.908 | Variable | | |
| 13* | 7.575 | 1.55 | 1.61881 | 63.85 |
| 14* | −748.191 | 1.00 | | |
| 15 (S) | ∞ | Variable | | |
| 16* | 7.389 | 2.21 | 1.62299 | 58.12 |
| 17 | −8.667 | 0.54 | 1.92286 | 20.88 |
| 18 | −15.240 | Variable | | |
| 19 | −15.019 | 0.50 | 2.00330 | 28.27 |
| 20 | 4.385 | 2.76 | 1.49700 | 81.54 |
| 21 | 23.375 | 0.95 | | |
| 22 | 16.401 | 1.86 | 1.84666 | 23.78 |
| 23 | −170.129 | 2.97 | | |
| 24 | ∞ | 0.50 | 1.51680 | 64.20 |
| 25 | ∞ | 0.50 | | |
| 26 | ∞ | 0.50 | 1.51680 | 64.20 |
| 27 | ∞ | Variable | | |
| Image plane | ∞ | | | |

Aspherical coefficients

5th surface

K = 0.000
A4 = −6.55943e−05, A6 = −8.82117e−07, A8 = 7.92269e−09,
A10 = −8.91766e−11

-continued unit mm

6th surface

K = 0.000
A4 = −1.11159e−04, A6 = 3.27232e−09
7th surface

K = 0.000
A4 = −3.42615e−05, A6 = −7.16361e−07, A8 = 9.17250e−09,
A10 = −6.93053e−11
13th surface K = 0.000
A4 = −2.18121e−04, A6 = −5.57157e−05, A8 = 8.11255e−06,
A10 = −3.75677e−07
14th surface K = 0.000
A4 = 4.45866e−07, A6 = −5.47270e−05, A8 = 9.16207e−06,
A10 = −4.54345e−07
16th surface K = 0.000
A4 = −4.68757e−04, A6 = −3.89983e−05, A8 = 6.28092e−06,
A10 = −3.86200e−07

Zoom data

|  | WE | ST | TE |
|---|---|---|---|
| IH | 3.84 | 3.84 | 3.84 |
| focal length | 5.07 | 9.40 | 17.80 |
| FNO. | 3.56 | 4.52 | 5.02 |
| 2ω (°) | 80.91 | 44.88 | 23.86 |
| BF | 4.49 | 4.50 | 4.50 |
| Total length | 53.00 | 53.00 | 53.00 |
| d7 | 0.50 | 7.19 | 11.94 |
| d12 | 11.94 | 5.25 | 0.50 |
| d15 | 5.37 | 3.89 | 2.05 |
| d18 | 1.51 | 2.99 | 4.84 |
| d27 | 0.37 | 0.37 | 0.37 |

Unit focal length

| f1 = 22.10 | f2 = −6.70 | f3 = 12.13 | f4 = 9.40 | f5 = −8.06 |

Example 2 unit mm

Surface data

| Surface No. | r | d | nd | νd |
|---|---|---|---|---|
| Object plane | ∞ | ∞ | | |
| 1 | 45.416 | 0.80 | 2.00069 | 25.46 |
| 2 | 9.417 | 2.15 | | |
| 3 | ∞ | 8.20 | 2.00069 | 25.46 |
| 4 | ∞ | 0.30 | | |
| 5* | 16.426 | 2.83 | 1.76802 | 49.24 |
| 6* | −19.890 | 0.50 | 1.84666 | 23.78 |
| 7* | −20.766 | Variable | | |
| 8 | 132.028 | 0.50 | 1.88300 | 40.76 |
| 9 | 7.730 | 1.10 | | |
| 10 | −18.656 | 0.45 | 1.88300 | 40.76 |
| 11 | 9.229 | 1.03 | 1.92286 | 20.88 |
| 12 | 18612.351 | Variable | | |
| 13* | 7.419 | 1.55 | 1.59201 | 67.02 |
| 14* | −382.725 | 1.00 | | |
| 15 (S) | ∞ | Variable | | |
| 16* | 7.573 | 2.29 | 1.62299 | 58.12 |
| 17 | −8.645 | 0.54 | 1.92286 | 20.88 |
| 18 | −13.989 | Variable | | |
| 19 | −19.406 | 0.50 | 2.00330 | 28.27 |
| 20 | 4.287 | 2.40 | 1.49700 | 81.54 |
| 21 | 14.998 | 0.90 | | |
| 22 | 17.389 | 1.81 | 1.84666 | 23.78 |
| 23 | −263.974 | 3.46 | | |
| 24 | ∞ | 0.50 | 1.51680 | 64.20 |
| 25 | ∞ | 0.50 | | |
| 26 | ∞ | 0.50 | 1.51680 | 64.20 |
| 27 | ∞ | Variable | | |
| Image plane | ∞ | | | |

Aspherical coefficients

5th surface

K = 0.000
A4 = −7.00709e−05, A6 = −2.05451e−06, A8 = 5.32718e−08,
A10 = −1.05841e−09
6th surface K = 0.000
A4 = −1.04156e−04, A6 = −1.34664e−06
7th surface K = 0.000
A4 = −3.78501e−05, A6 = −1.99585e−06, A8 = 5.28166e−08,
10 = −9.43976e−10
13th surface K = 0.000
A4 = −1.00400e−04, A6 = −2.48065e−05, A8 = 5.44127e−06,
A10 = −1.24851e−07
14th surface K = 0.000
A4 = 2.01933e−04, A6 = −2.70624e−05, A8 = 7.50465e−06,
A10 = −2.28331e−07
16th surface K = 0.000
A4 = −5.08693e−04, A6 = −2.87324e−05, A8 = 4.03028e−06,
A10 = −2.26882e−07

Zoom data

|  | WE | ST | TE |
|---|---|---|---|
| IH | 3.84 | 3.84 | 3.84 |
| focal length | 5.07 | 9.40 | 18.00 |
| FNO. | 3.52 | 4.62 | 5.17 |
| 2ω (°) | 80.79 | 44.64 | 23.46 |
| BF | 4.98 | 4.99 | 4.98 |
| Total length | 53.06 | 53.06 | 53.06 |
| d7 | 0.50 | 7.05 | 11.70 |
| d12 | 11.70 | 5.15 | 0.50 |
| d15 | 5.50 | 3.99 | 2.05 |
| d18 | 1.51 | 3.03 | 4.97 |
| d27 | 0.37 | 0.37 | 0.37 |

Unit focal length

| f1 = 21.73 | f2 = −6.44 | f3 = 12.31 | f4 = 9.18 | f5 = −7.32 |

Example 3 unit mm

Surface data

| Surface No. | r | d | nd | νd |
|---|---|---|---|---|
| Object plane | ∞ | ∞ | | |
| 1 | 48.023 | 0.80 | 2.00069 | 25.46 |

-continued unit mm

| | | | | |
|---|---|---|---|---|
| 2 | 9.552 | 2.17 | | |
| 3 | ∞ | 8.20 | 1.92286 | 18.90 |
| 4 | ∞ | 0.30 | | |
| 5* | 16.345 | 2.76 | 1.76802 | 49.24 |
| 6* | −20.808 | 0.50 | 1.80486 | 24.74 |
| 7* | −20.448 | Variable | | |
| 8 | 102.127 | 0.50 | 1.88300 | 40.76 |
| 9 | 7.539 | 1.29 | | |
| 10 | −17.549 | 0.45 | 1.88300 | 40.76 |
| 11 | 9.328 | 1.04 | 1.92286 | 20.88 |
| 12 | 12057.593 | Variable | | |
| 13* | 7.713 | 1.53 | 1.61881 | 63.85 |
| 14* | −1869.515 | 1.00 | | |
| 15 (S) | ∞ | Variable | | |
| 16* | 7.540 | 2.31 | 1.59201 | 67.02 |
| 17 | −8.718 | 0.54 | 1.92286 | 20.88 |
| 18 | −12.573 | Variable | | |
| 19 | −23.438 | 0.50 | 2.00330 | 28.27 |
| 20 | 4.331 | 2.05 | 1.49700 | 81.54 |
| 21 | 10.416 | 0.89 | | |
| 22 | 13.890 | 1.80 | 1.84666 | 23.78 |
| 23 | −965.211 | 4.15 | | |
| 24 | ∞ | 0.50 | 1.51680 | 64.20 |
| 25 | ∞ | 0.50 | | |
| 26 | ∞ | 0.50 | 1.51680 | 64.20 |
| 27 | ∞ | Variable | | |
| Image plane | ∞ | | | |

Aspherical coefficients

5th surface

K = 0.000
A4 = −8.29849e−05, A6 = −1.93306e−06, A8 = 5.63887e−08,
A10 = −1.39775e−09

6th surface

K = 0.000
A4 = −8.73969e−05, A6 = −1.70221e−06

7th surface

K = 0.000
A4 = −4.13394e−05, A6 = −1.68314e−06, A8 = 4.71082e−08,
A10 = −1.12461e−09

13th surface

K = 0.000
A4 = −1.08552e−04, A6 = −3.35378e−05, A8 = 7.17538e−06,
A10 = −2.36057e−07

14th surface

K = 0.000
A4 = 1.75203e−04, A6 = −4.32494e−05, A8 = 1.01632e−05,
A10 = −3.85160e−07

16th surface

K = 0.000
A4 = −5.74224e−04, A6 = −3.74061e−05, A8 = 5.26027e−06,
A10 = −2.88272e−07

Zoom data

| | WE | ST | TE |
|---|---|---|---|
| IH | 3.84 | 3.84 | 3.84 |
| focal length | 5.07 | 9.40 | 18.00 |
| FNO. | 3.53 | 4.66 | 5.21 |
| 2ω (°) | 80.86 | 44.54 | 23.46 |
| BF | 5.68 | 5.68 | 5.68 |
| Total length | 53.06 | 53.06 | 53.06 |
| D7 | 0.50 | 6.77 | 11.26 |
| D12 | 11.26 | 4.99 | 0.50 |
| D15 | 5.47 | 3.96 | 2.05 |
| D18 | 1.51 | 3.02 | 4.94 |
| D27 | 0.37 | 0.37 | 0.37 |

-continued unit mm

Unit focal length

| | | | | |
|---|---|---|---|---|
| f1 = 20.45 | f2 = −6.23 | f3 = 12.42 | f4 = 9.17 | f5 = −7.61 |

Example 4 unit mm

Surface data

| Surface No. | r | d | nd | vd |
|---|---|---|---|---|
| Object plane | ∞ | ∞ | | |
| 1 | 70.959 | 0.80 | 2.00069 | 25.46 |
| 2 | 10.026 | 2.01 | | |
| 3 | ∞ | 8.20 | 2.00069 | 25.46 |
| 4 | ∞ | 0.30 | | |
| 5* | 15.900 | 2.87 | 1.76802 | 49.24 |
| 6 | −19.059 | 0.50 | 1.92286 | 20.88 |
| 7* | −19.884 | Variable | | |
| 8 | 43.853 | 0.50 | 1.88300 | 40.76 |
| 9 | 7.265 | 1.25 | | |
| 10 | −17.823 | 0.45 | 1.88300 | 40.76 |
| 11 | 8.797 | 1.04 | 1.92286 | 20.88 |
| 12 | 3459.522 | Variable | | |
| 13* | 7.423 | 1.54 | 1.61881 | 63.85 |
| 14* | −1923.137 | 1.00 | | |
| 15 (S) | ∞ | Variable | | |
| 16* | 7.762 | 2.21 | 1.62299 | 58.12 |
| 17 | −8.733 | 0.54 | 1.92286 | 20.88 |
| 18 | −16.050 | Variable | | |
| 19 | −16.149 | 0.50 | 2.00330 | 28.27 |
| 20 | 4.429 | 3.06 | 1.49700 | 81.54 |
| 21 | 47.507 | 1.08 | | |
| 22 | 15.496 | 1.84 | 1.84666 | 23.78 |
| 23 | −90.773 | 2.97 | | |
| 24 | ∞ | 0.50 | 1.51680 | 64.20 |
| 25 | ∞ | 0.50 | | |
| 26 | ∞ | 0.50 | 1.51680 | 64.20 |
| 27 | ∞ | Variable | | |
| Image plane | ∞ | | | |

Aspherical coefficients

5th surface

K = 0.000
A4 = −6.92898e−06, A6 = −1.51793e−06, A8 = −1.45428e−08,
A10 = 1.07679e−09

7th surface

K = 0.000
A4 = 4.70669e−05, A6 = −1.85915e−06, A8 = 1.34450e−08,
A10 = 6.20817e−10

13th surface

K = 0.000
A4 = −1.08744e−04, A6 = −1.25440e−05, A8 = 4.35562e−06,
A10 = −1.76051e−07

14th surface

K = 0.000
A4 = 2.15233e−04, A6 = −2.32177e−05, A8 = 7.37206e−06,
A10 = −3.48784e−07

16th surface

K = 0.000
A4 = −3.51981e−04, A6 = −3.85528e−05, A8 = 5.38642e−06,
A10 = −3.09463e−07

-continued unit mm

Zoom data

|  | WE | ST | TE |
|---|---|---|---|
| IH | 3.84 | 3.84 | 3.84 |
| focal length | 5.08 | 9.40 | 17.80 |
| FNO. | 3.51 | 4.40 | 4.85 |
| 2ω (°) | 80.32 | 44.41 | 23.71 |
| BF | 4.49 | 4.50 | 4.50 |
| Total length | 53.00 | 53.00 | 53.00 |
| d7 | 0.50 | 6.81 | 11.39 |
| d12 | 11.39 | 5.08 | 0.50 |
| d15 | 5.42 | 3.87 | 2.05 |
| d18 | 1.51 | 3.06 | 4.88 |
| d27 | 0.37 | 0.37 | 0.37 |

Unit focal length f1 = 20.34   f2 = −6.61   f3 = 11.95   f4 = 9.99   f5 = −11.10

Example 5 unit mm

Surface data

| Surface No. | r | d | nd | vd |
|---|---|---|---|---|
| Object plane | ∞ | ∞ | | |
| 1 | 47.576 | 0.80 | 2.00069 | 25.46 |
| 2 | 9.865 | 2.12 | | |
| 3 | ∞ | 8.10 | 2.00069 | 25.46 |
| 4 | ∞ | 0.20 | | |
| 5* | 14.509 | 0.50 | 1.68893 | 31.16 |
| 6* | 16.229 | 2.70 | 1.76802 | 49.24 |
| 7* | −22.201 | Variable | | |
| 8 | 57.000 | 0.50 | 1.88300 | 40.76 |
| 9 | 6.900 | 1.04 | | |
| 10 | −13.215 | 0.45 | 1.88300 | 40.76 |
| 11 | 8.234 | 1.13 | 1.92286 | 20.88 |
| 12 | −9043.884 | Variable | | |
| 13* | 9.884 | 1.51 | 1.62299 | 58.12 |
| 14* | −31.235 | 1.00 | | |
| 15 (S) | ∞ | Variable | | |
| 16* | 9.047 | 2.39 | 1.62299 | 58.12 |
| 17 | −7.416 | 0.54 | 1.92286 | 20.88 |
| 18 | −11.778 | Variable | | |
| 19 | −67.084 | 0.50 | 2.00330 | 28.27 |
| 20 | 4.329 | 2.38 | 1.51633 | 64.14 |
| 21 | 12.252 | 0.99 | | |
| 22 | 13.483 | 1.79 | 1.84666 | 23.78 |
| 23 | −405.338 | 4.51 | | |
| 24 | ∞ | 0.50 | 1.51680 | 64.20 |
| 25 | ∞ | 0.50 | | |
| 26 | ∞ | 0.50 | 1.51680 | 64.20 |
| 27 | ∞ | Variable | | |
| Image plane | ∞ | | | |

Aspherical coefficients

5th surface

K = 0.000
A4 = −1.12745e−04, A6 = 1.63754e−06, A8 = −7.60798e−08,
A10 = 2.26275e−09

6th surface

K = 0.000
A4 = 2.64442e−04, A6 = −4.25493e−06

7th surface

K = 0.000
A4 = −1.66605e−05, A6 = 7.56969e−07, A8 = −4.90942e−08,
A10 = 1.90410e−09

13th surface

K = 0.000
A4 = −1.63972e−04, A6 = −8.11604e−05, A8 = 1.51106e−05,
A10 = −8.36047e−07

14th surface

K = 0.000
A4 = 9.51043e−05, A6 = −9.47965e−05, A8 = 1.78131e−05,
A10 = −1.00149e−06

16th surface

K = 0.000
A4 = −3.56969e−04, A6 = −1.93641e−05, A8 = 2.58109e−06,
A10 = −1.18322e−07

Zoom data

|  | WE | ST | TE |
|---|---|---|---|
| IH | 3.84 | 3.84 | 3.84 |
| focal length | 5.06 | 9.40 | 17.42 |
| FNO. | 3.53 | 4.36 | 5.05 |
| 2ω (°) | 80.78 | 44.37 | 24.21 |
| BF | 6.04 | 6.04 | 6.04 |
| Total length | 52.96 | 52.96 | 52.96 |
| d7 | 0.60 | 6.19 | 9.73 |
| d12 | 9.64 | 4.05 | 0.50 |
| d15 | 6.52 | 4.49 | 2.05 |
| d18 | 1.51 | 3.54 | 5.99 |
| d27 | 0.37 | 0.37 | 0.37 |

Unit focal length f1 = 19.66   f2 = −5.54   f3 = 12.22   f4 = 9.78   f5 = −11.26

Example 6 unit mm

Surface data

| Surface No. | r | d | nd | vd |
|---|---|---|---|---|
| Object plane | ∞ | ∞ | | |
| 1 | 44.538 | 0.80 | 2.00069 | 25.46 |
| 2 | 9.675 | 2.17 | | |
| 3 | ∞ | 8.10 | 2.00069 | 25.46 |
| 4 | ∞ | 0.20 | | |
| 5* | 14.485 | 0.50 | 1.68893 | 31.16 |
| 6* | 17.071 | 2.71 | 1.76802 | 49.24 |
| 7* | −21.915 | Variable | | |
| 8 | 60.506 | 0.50 | 1.88300 | 40.76 |
| 9 | 7.091 | 1.08 | | |
| 10 | −12.709 | 0.45 | 1.88300 | 40.76 |
| 11 | 8.208 | 1.10 | 1.92286 | 20.88 |
| 12 | −8266.919 | Variable | | |
| 13* | 9.985 | 1.53 | 1.61881 | 63.85 |
| 14* | −29.655 | 1.00 | | |
| 15 (S) | ∞ | Variable | | |
| 16* | 9.162 | 2.39 | 1.62299 | 58.12 |
| 17 | −7.357 | 0.54 | 1.92286 | 20.88 |
| 18 | −11.572 | Variable | | |
| 19 | −93.671 | 0.50 | 2.00330 | 28.27 |
| 20 | 4.419 | 2.12 | 1.51633 | 64.14 |
| 21 | 10.777 | Variable | | |
| 22 | 13.729 | 1.82 | 1.84666 | 23.78 |

-continued unit mm

| 23 | −631.985 | Variable | | |
|---|---|---|---|---|
| 24 | ∞ | 0.50 | 1.51680 | 64.20 |
| 25 | ∞ | 0.50 | | |
| 26 | ∞ | 0.50 | 1.51680 | 64.20 |
| 27 | ∞ | Variable | | |
| Image plane | ∞ | | | |

Aspherical coefficients

5th surface

K = 0.000
A4 = −1.24386e−04, A6 = 1.66671e−06, A8 = −6.40254e−08,
A10 = 1.62666e−09

6th surface

K = 0.000
A4 = 2.60978e−04, A6 = −4.24262e−06

7th surface

K = 0.000
A4 = −3.03650e−05, A6 = 1.06900e−06, A8 = −5.05687e−08,
A10 = 1.47006e−09

13th surface

K = 0.000
A4 = −1.27245e−04, A6 = −9.38995e−05, A8 = 1.49223e−05,
A10 = −8.01384e−07

14th surface

K = 0.000
A4 = 9.82059e−05, A6 = −9.56113e−05, A8 = 1.58272e−05,
A10 = −8.74864e−07

16th surface

K = 0.000
A4 = −4.01115e−04, A6 = −1.38160e−05, A8 = 1.68533e−06,
A10 = −7.43591e−08

Zoom data

| | WE | ST | TE |
|---|---|---|---|
| IH | 3.84 | 3.84 | 3.84 |
| focal length | 5.05 | 9.40 | 17.42 |
| FNO. | 3.53 | 4.39 | 5.08 |
| 2ω (°) | 80.86 | 44.45 | 24.22 |
| BF | 6.17 | 5.14 | 5.32 |
| Total length | 52.96 | 52.96 | 52.96 |
| d7 | 0.60 | 6.13 | 9.68 |
| d12 | 9.58 | 4.05 | 0.50 |
| d15 | 6.64 | 4.46 | 2.05 |
| d18 | 1.51 | 3.70 | 6.11 |
| d21 | 0.94 | 1.97 | 1.79 |
| d23 | 4.64 | 3.61 | 3.79 |
| d27 | 0.37 | 0.37 | 0.37 |

Unit focal length f1 = 19.45    f2 = −5.52    f3 = 12.25    f4 = 9.77    f5 = −5.64
f6 = 15.89

Aberration diagrams of the zoom lenses according to the first to examples 1 to 6 in the state in which the zoom lenses are focused on an object point at infinity are shown in FIGS. 7A to 12C.

FIGS. 7A, 8A, 9A, 10A, 11A, and 12A show spherical aberration (SA), astigmatism (AS), distortion (DT) and chromatic aberration of magnification (CC) at the wide angle end.

FIGS. 7B, 8B, 9B, 10B, 11B, and 12B show spherical aberration (SA), astigmatism (AS), distortion (DT) and chromatic aberration of magnification (CC) in an intermediate state.

FIGS. 7C, 8C, 9C, 10C, 11C, and 12C show spherical aberration (SA), astigmatism (AS), distortion (DT) and chromatic aberration of magnification (CC) at the telephoto end.

In the aberrations diagrams, the sign "ω" represents half the angle of field.

Values of conditional expressions (1) to (6) in each of examples are as shown below.

| | (1) $|\nu_{11} - \nu_{12}|$ | (2) $(r_1 + r_2)/(r_1 - r_2)$ | (3) $N_{dL1}$ | (4) $|f_2/f_w|$ | (5) $f_1/f_w$ | (6) $|f_{1U11}/f_w|$ |
|---|---|---|---|---|---|---|
| Example 1 | 28.36 | −0.75 | 1.92286 | 1.32 | 4.35 | 2.32 |
| Example 2 | 25.46 | −0.79 | 1.84666 | 1.27 | 4.28 | 2.37 |
| Example 3 | 24.5 | −0.80 | 1.80486 | 1.22 | 4.03 | 2.37 |
| Example 4 | 28.36 | −0.80 | 1.92286 | 1.30 | 4.00 | 2.31 |
| Example 5 | 18.08 | −0.65 | 1.68893 | 1.09 | 3.88 | 2.48 |
| Example 6 | 18.08 | −0.66 | 1.68893 | 1.09 | 3.85 | 2.47 |

A flare stop may be provided in addition to the aperture stop in order to eliminate unwanted light that may cause ghost images, lens flare or the like.

The flare stop may be disposed on the object side of the first lens unit, between the first lens unit and the second lens unit, between the second lens unit and the third lens unit, between the third lens unit and the fourth lens unit, between the fourth lens unit and the fifth lens unit, or between the lens unit closest to the image plane and the image plane. A frame member may be adapted to cut flare rays. Alternatively, a separate member may be provided for this purpose. Alternatively, a flare stop may be provided on a component in the optical system by direct printing, by painting, or by attaching a sheet or the like. The aperture of the flare stop may have various shapes such as circular, elliptical, rectangular, or polygonal shape, or the shape of the aperture may be defined by a curve specified by a mathematical function. The flare stop may be adapted to cut not only detrimental beams but also beams that may cause coma flare etc. in the peripheral region of the picture area.

It is preferred that the first lens unit G1 serves as the focusing lens unit for performing focusing. If focusing is performed by moving the first lens unit, the load on the motor upon focusing can be made small, because the first lens unit is light in weight. Focusing may be performed by another lens unit. Focusing may be performed by moving a plurality of lens units. Alternatively, focusing may be performed by advancing the entire lens system, or by advancing or retracting one or some lenses.

Brightness fall-off (or shading) in the peripheral region of the picture area may be reduced by shifting the positions of micro lenses on the CCD. For example, the design of the micro lenses on the CCD may be varied in accordance with changes in the angle of incidence of rays at different image heights.

Brightness fall-off in the peripheral region of the picture area may be corrected by image processing.

(Anti-Reflection Coating)

Anti-reflection coating may be applied on each lens to reduce ghost images and flare. Use of multi-layer coating, which can effectively reduce ghost images and flare, is desirable. Coating for cutting infrared light may be applied on a lens surface(s) and/or the cover glass etc. Incidentally, for preventing the occurrence of the ghost and the flare, generally, the antireflection coating is applied to a surface of a lens in contact with air. On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases.

However, when the antireflection coating is applied positively even to the cemented surface, it is possible to reduce further the ghost and the flare, and to achieve a more favorable image. Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics. Moreover, for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 13:
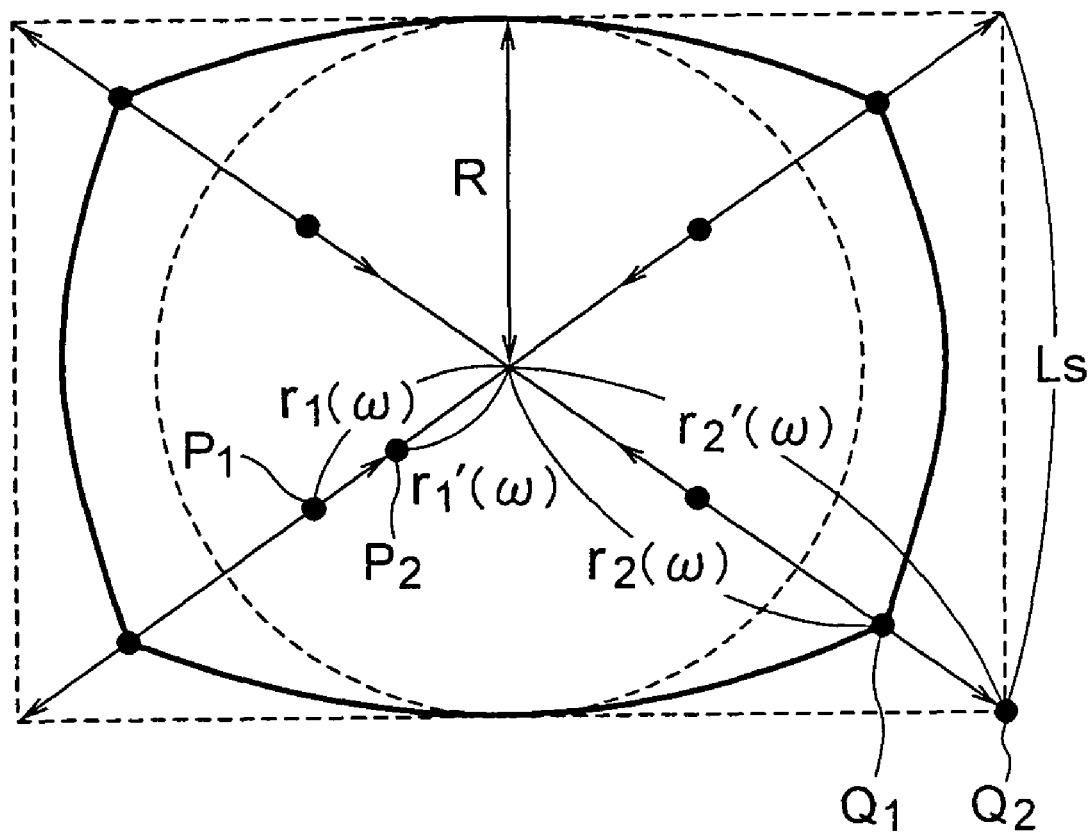
FIG. 13 is a diagram illustrating correction of distortion.

For example, as shown in FIG. 13, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius $r(\omega)$ other than the radius R is moved in a substantial direction of radiation, and the correction is carried out by moving on a concentric circle such that the radius becomes $r'(\omega)$.

For example, in FIG. 13, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, $r'(\omega)$ can be expressed as follows.

$$r'(\omega) = \alpha \cdot f \tan \omega \, (0 \leq \alpha \leq 1)$$

where, $\omega$ is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel $(Xi, Yj)$, a method of determining coordinates of a destination of movement $(Xi', Yj')$ may be used. When two or more points $(Xi, Yj)$ have moved to the coordinates $(Xi', Yj')$, an average of values of each pixel is taken. Moreover, when there is no point which has moved, interpolation may be performed by using a value of coordinate $(Xi', Yj')$ of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega)-r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6Ls$$

where, Ls is a length of a short side of the effective image pickup surface.

It is preferable that the radius R satisfies the following conditional expression.

$$0.3Ls \leq R \leq 0.6Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y/\tan \omega$$

holds.

Here, y denotes a height (image height) of an image point from the optical axis, f denotes a focal length of an imaging system (zoom lens system in the present invention), and ω denotes an angle (object half image angle) with respect to the optical axis in an object point direction corresponding to image points connecting from a center on an image pickup plane up to a position of y.

When there is a barrel-shape distortion in the imaging system, the relationship becomes $$f > y/\tan \omega.$$

In other words, when the focal length f of the imaging system, and the image height y are let to be fixed, a value of ω becomes large.

(Digital Camera)

Further, the present invention could be applied to an electrical image pickup apparatus, especially a digital camera, video camera etc. in which the object image is formed by the above-mentioned zoom lens, then the object image is light-received such as CCD etc. Such embodiment will be described below.

Figure 14:
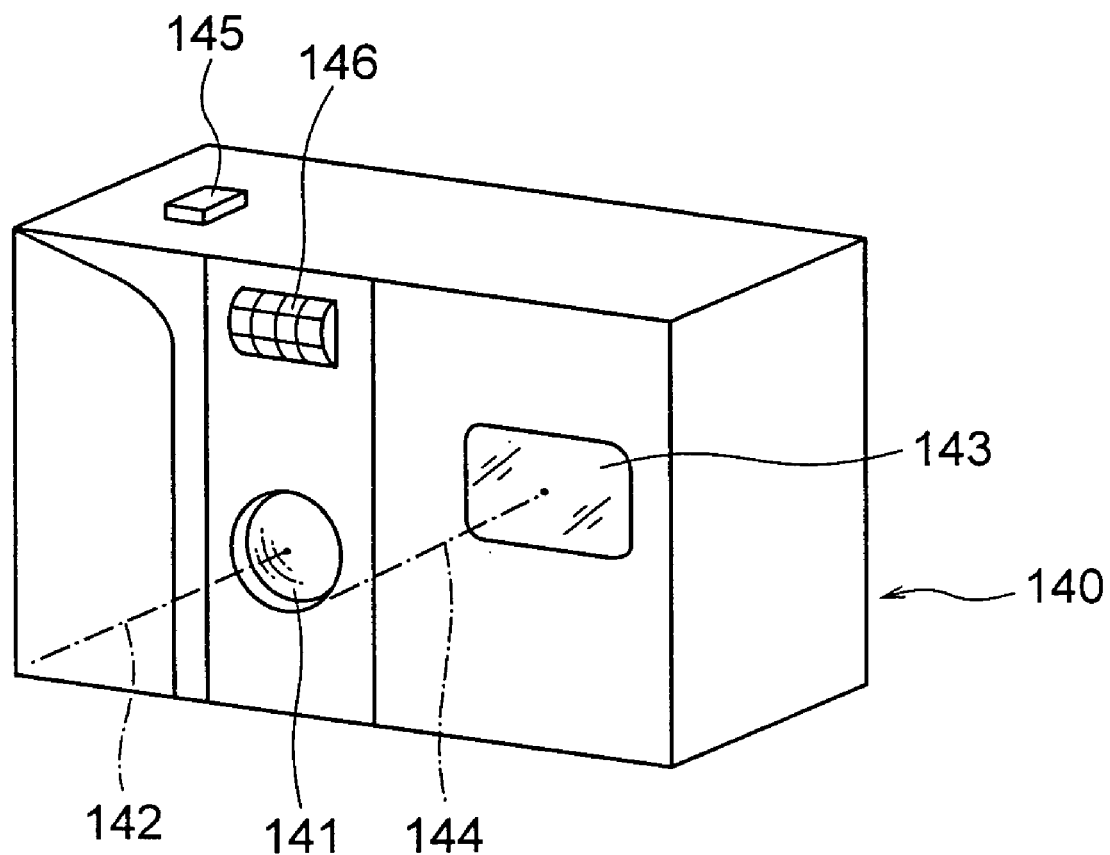
FIG. 14 is a front perspective view showing an outer appearance of a digital camera equipped with a zoom lens having a bent optical path according to the present invention.
Figure 15:
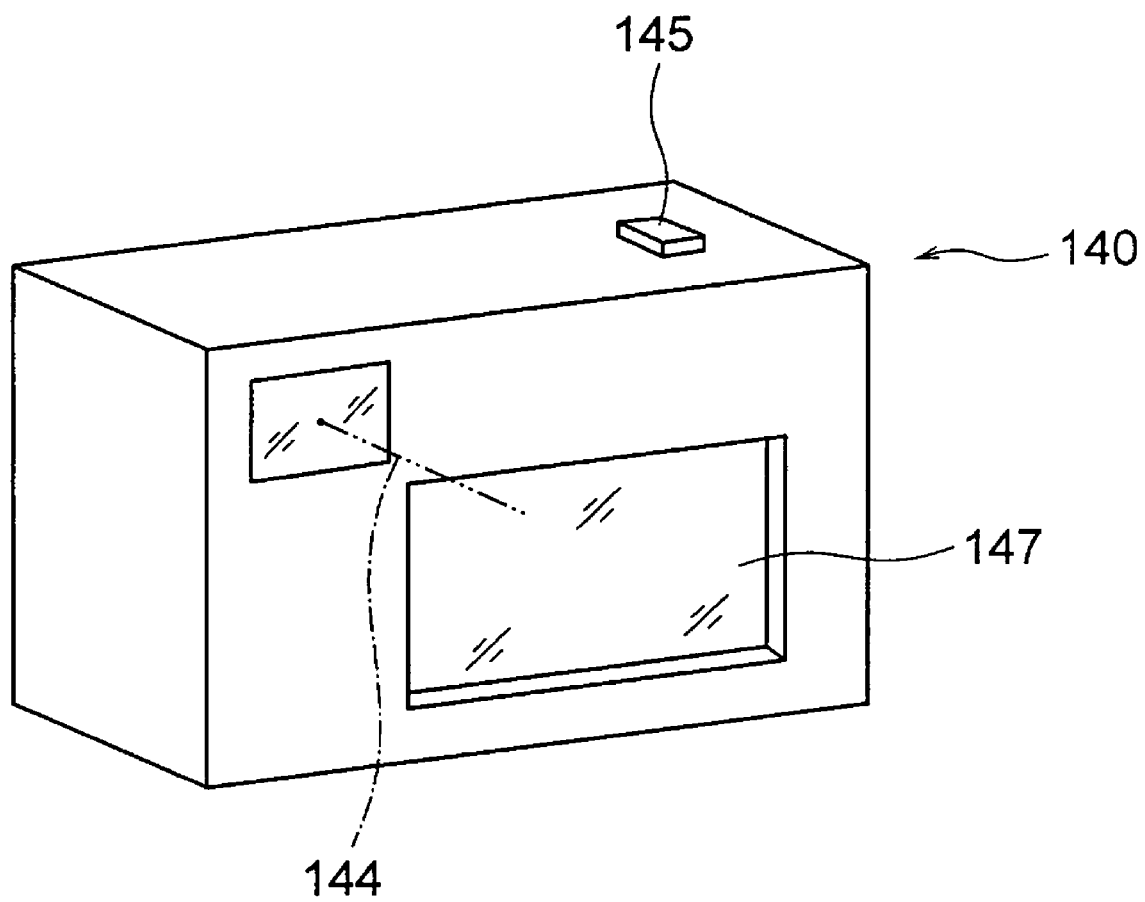
FIG. 15 is a rear perspective view of the digital camera.
Figure 16:
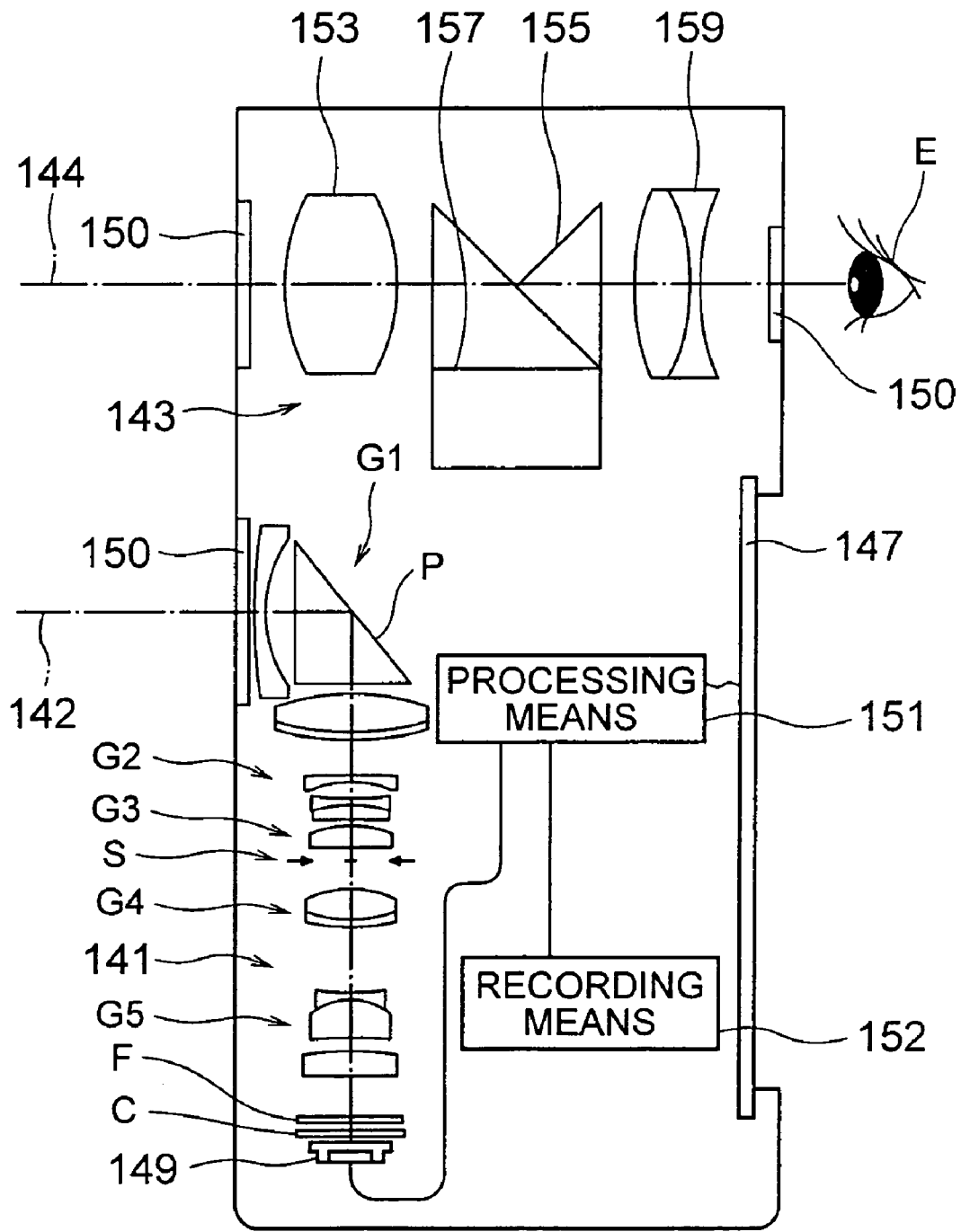
FIG. 16 is a cross sectional view of the digital camera.

FIG. 14 to FIG. 16 are conceptual diagrams of a structure of a digital camera according to the present invention in which a zoom lens system described above is incorporated in a taking optical system 141. FIG. 14 is a front perspective view showing an appearance of a digital camera 140, FIG. 15 is a rear perspective view of the same, and FIG. 16 is a schematic cross-sectional view showing a structure of the digital camera 140. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., when the shutter button 145 disposed on an upper portion of the digital camera 140 is pressed, in synchronization with the pressing of the shutter button 145, a photograph is taken by the taking optical system 141 such as the optical path reflecting zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. An object image formed by the finder objective optical system 153 is formed on a field frame 157 of a Porro prism 155 which is an image erecting member. On a rear side of the Porro prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has a high zoom ratio of 5 magnifications. Since the zoom lens has a high optical performance, it is possible to realize the inexpensive digital camera in which the depth is extremely thin.

Further, the example shown in FIG. 16, a plane parallel plate is disposed as the cover member 150. However, a lens having a power could be used. Furthermore, the cover member 150 could be omitted.

(Internal Circuit Structure)

Figure 17:
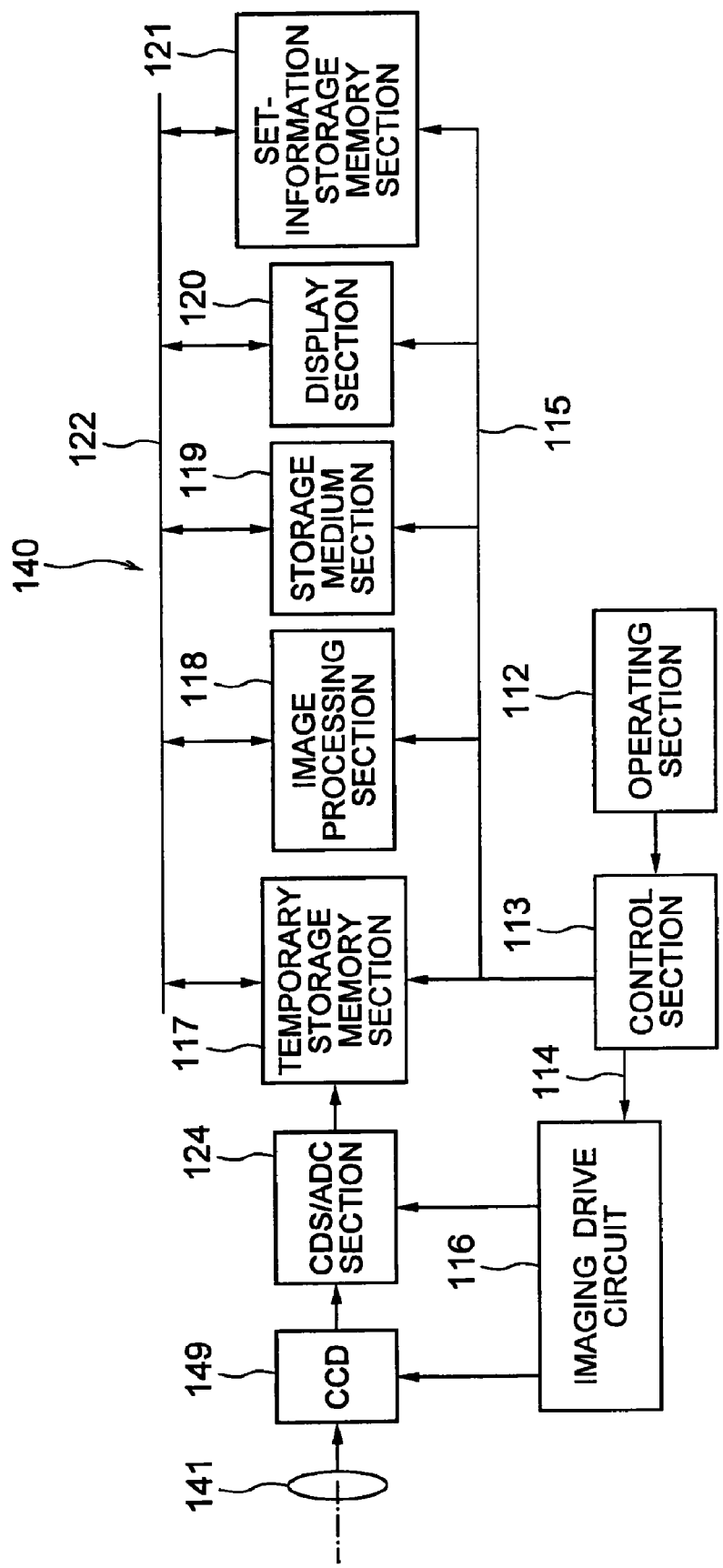
FIG. 17 is a block diagram of an internal circuit of a principal portion of the digital camera.

FIG. 17 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 17, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As described in the foregoing, the zoom lens and the image pickup apparatus according to the present invention is useful in cases where size reduction is to be achieved while maintaining good optical performance.

What is claimed is:

1. A zoom lens comprising, in order from the object side thereof:
   a first lens unit having a positive refracting power;
   a second lens unit having a negative refracting power;
   a third lens unit having a positive refracting power;
   a fourth lens unit having a positive refracting power; and
   a fifth lens unit having a negative refracting power, wherein
   during zooming from the wide angle end to the telephoto end, the first lens unit and the third lens unit are kept stationary with respect to an image plane, and at least the second lens unit and the fourth lens unit move,
   the first lens unit comprises, in order from the object side, a first sub unit having a negative refracting power, a reflecting optical element that bends an optical path by reflection, and a second sub unit having a positive refracting power, and
   the second sub unit comprises a cemented lens;
   wherein the cemented lens in the second sub unit having a positive refracting power has an aspheric cemented surface.

2. The zoom lens according to claim 1, wherein the second sub unit having a positive refracting power in the first lens unit comprises a cemented lens made up of a first lens element and a second lens element, and the zoom lens satisfies the following conditional expression (1):

$$|v_{11}-v_{12}|>15 \qquad (1)$$

where $v_{11}$ is an Abbe number of the first lens element, and $v_{12}$ is an Abbe number of the second lens element.

3. The zoom lens according to claim 1, wherein the zoom lens satisfies the following conditional expression (2):

$$-0.6<(r_1+r_2)/(r_1-r_2)<0.6 \qquad (2)$$

where $r_1$ is a radius of curvature of an object side surface of the cemented lens in the second sub unit having a positive refracting power in the first lens unit, and $r_2$ is a radius of curvature of an image side surface of the cemented lens in the second sub unit having a positive refracting power in the first lens unit.

4. The zoom lens according to claim 1, wherein the cemented lens has a positive refracting power, the cemented lens has a first lens element and a second lens element, and the zoom lens satisfies the following conditional expression (3):

$$N_{dL1}>1.68 \qquad (3)$$

where $N_{dL1}$ is a refractive index for the d-line of a lens element L1 having a weaker refracting power among the first lens element and the second lens element.

5. The zoom lens according to claim 1, wherein the zoom lens satisfies the following conditional expression (4):

$$0.8<|f_2/f_w|<2.0 \qquad (4)$$

where $f_2$ is a focal length of the second lens unit, and $f_w$ is a focal length of the entire zoom lens system at the wide angle end.

6. The zoom lens according to claim 1, wherein the zoom lens satisfies the following conditional expression (5):

$$2.0<f_1/f_w<5.0 \qquad (5)$$

where $f_1$ is a focal length of the first lens unit, and $f_w$ is a focal length of the entire zoom lens system at the wide angle end.

7. The zoom lens according to claim 1, wherein the zoom lens satisfies the following conditional expression (6):

$$1.0 < |f_{1U11}/f_w| < 4.0 \quad (6)$$

where $f_{1u11}$ is a focal length of the first sub unit in the first lens unit, and $f_w$ is a focal length of the entire zoom lens system at the wide angle end.

8. An image pickup apparatus comprising:
a zoom lens according to claim 1; and
an image pickup element disposed on the image side of the zoom lens and converting an optical image formed by the zoom lens into an electrical signal.

9. The zoom lens according to claim 1, wherein the zoom lens is a five unit zoom lens in which a total number of the lens units in the zoom lens is five.

10. The zoom lens according to claim 1, wherein, in the first lens unit, only the cemented lens is a lens which is disposed on the image side with respect to the reflecting optical element.

11. A zoom lens comprising, in order from the object side thereof:
a first lens unit having a positive refracting power;
a second lens unit having a negative refracting power;
a third lens unit having a positive refracting power;
a fourth lens unit having a positive refracting power; and
a fifth lens unit having a negative refracting power, wherein
during zooming from the wide angle end to the telephoto end, the first lens unit and the third lens unit are kept stationary with respect to an image plane, and at least the second lens unit and the fourth lens unit move,
the first lens unit comprises, in order from the object side, a first sub unit having a negative refracting power, a reflecting optical element that bends an optical path by reflection, and a second sub unit having a positive refracting power, and
the second sub unit comprises a cemented lens;
wherein the second sub unit having a positive refracting power in the first lens unit comprises a cemented lens made up of a first lens element and a second lens element, and the zoom lens satisfies the following conditional expression (1):

$$|v_{11} - v_{12}| > 15 \quad (1)$$

where $v_{11}$ is an Abbe number of the first lens element, and $v_{12}$ is an Abbe number of the second lens element;
wherein in the first lens unit, only the cemented lens is a lens which is disposed on the image side with respect to the reflecting optical element; and
wherein the cemented lens in the second sub unit having a positive refracting power has an aspheric cemented surface.

12. A zoom lens comprising, in order from the object side thereof:
a first lens unit having a positive refracting power;
a second lens unit having a negative refracting power;
a third lens unit having a positive refracting power;
a fourth lens unit having a positive refracting power; and
a fifth lens unit having a negative refracting power, wherein
during zooming from the wide angle end to the telephoto end, the first lens unit and the third lens unit are kept stationary with respect to an image plane, and at least the second lens unit and the fourth lens unit move,
the first lens unit comprises, in order from the object side, a first sub unit having a negative refracting power, a reflecting optical element that bends an optical path by reflection, and a second sub unit having a positive refracting power, and
the second sub unit comprises a cemented lens;
wherein the second sub unit having a positive refracting power in the first lens unit comprises a cemented lens made up of a first lens element and a second lens element, and the zoom lens satisfies the following conditional expression (1):

$$|v_{11} - v_{12}| > 15 \quad (1)$$

where $v_{11}$ is an Abbe number of the first lens element, and $v_{12}$ is an Abbe number of the second lens element;
wherein in the first lens unit, only the cemented lens is a lens which is disposed on the image side with respect to the reflecting optical element; and
wherein the zoom lens satisfies the following conditional expression (6):

$$1.0 < |f_{1U11}/f_w| < 4.0 \quad (6)$$

where $f_{1u11}$ is a focal length of the first sub unit in the first lens unit, and $f_w$ is a focal length of the entire zoom lens system at the wide angle end.

13. The zoom lens according to claim 12, wherein the zoom lens satisfies the following conditional expression (2):

$$-0.6 < (r_1 + r_2)/(r_1 - r_2) < 0.6 \quad (2)$$

where $r_1$ is a radius of curvature of an object side surface of the cemented lens in the second sub unit having a positive refracting power in the first lens unit, and $r_2$ is a radius of curvature of an image side surface of the cemented lens in the second sub unit having a positive refracting power in the first lens unit.

14. The zoom lens according to claim 12, wherein the cemented lens in the second sub unit has a positive refracting power, the cemented lens has a first lens element and a second lens element, and the zoom lens satisfies the following conditional expression (3):

$$N_{dL1} > 1.68 \quad (3)$$

where $N_{dL1}$ is a refractive index for the d-line of a lens element L1 having a weaker refracting power among the first lens element and the second lens element.

15. The zoom lens according to claim 12, wherein the zoom lens satisfies the following conditional expression (4):

$$0.8 < |f_2/f_w| < 2.0 \quad (4)$$

where $f_2$ is a focal length of the second lens unit, and $f_w$ is a focal length of the entire zoom lens system at the wide angle end.

16. The zoom lens according to claim 12, wherein the zoom lens satisfies the following conditional expression (5):

$$2.0 < < f_1/f_w < 5.0 \quad (5)$$

where $f_1$ is a focal length of the first lens unit, and $f_w$ is a focal length of the entire zoom lens system at the wide angle end.

17. An image pickup apparatus comprising:
a zoom lens according to claim 12; and
an image pickup element disposed on the image side of the zoom lens and converting an optical image formed by the zoom lens into an electrical signal.

18. The zoom lens according to claim 12, wherein the zoom lens is a five unit zoom lens in which a total number of the lens units in the zoom lens is five.

19. The zoom lens according to claim 11,
wherein the zoom lens satisfies the following conditional expression (2):

$$-0.6 < (r_1+r_2)/(r_1-r_2) < 0.6 \qquad (2)$$

where $r_1$ is a radius of curvature of an object side surface of the cemented lens in the second sub unit having a positive refracting power in the first lens unit, and $r_2$ is a radius of curvature of an image side surface of the cemented lens in the second sub unit having a positive refracting power in the first lens unit.

20. The zoom lens according to claim 19, wherein the zoom lens is a five unit zoom lens in which a total number of the lens units in the zoom lens is five.

21. The zoom lens according to claim 11,
wherein the cemented lens has a positive refracting power, and the zoom lens satisfies the following conditional expression (3):

$$N_{dL1} > 1.68 \qquad (3)$$

where $N_{dL1}$ is a refractive index for the d-line of a lens element L1 having a weaker refracting power among the first lens element and the second lens element.

22. The zoom lens according to claim 21, wherein the zoom lens is a five unit zoom lens in which a total number of the lens units in the zoom lens is five.

23. The zoom lens according to claim 11,
wherein the zoom lens satisfies the following conditional expression (4):

$$0.8 < |f_2/f_w| < 2.0 \qquad (4)$$

where $f_2$ is a focal length of the second lens unit, and $f_w$ is a focal length of the entire zoom lens system at the wide angle end.

24. The zoom lens according to claim 23, wherein the zoom lens is a five unit zoom lens in which a total number of the lens units in the zoom lens is five.

* * * * *